US007608358B2

(12) United States Patent
Ye

(10) Patent No.: US 7,608,358 B2
(45) Date of Patent: Oct. 27, 2009

(54) FUEL CELL ANODE STRUCTURE FOR VOLTAGE REVERSAL TOLERANCE

(75) Inventor: Siyu Ye, Burnaby (CA)

(73) Assignee: BDF IP Holdings Ltd., Vancouber, BC (CA)

(*) Notice: Subject to any disclaimer, the term of this patent is extended or adjusted under 35 U.S.C. 154(b) by 0 days.

(21) Appl. No.: 12/400,352

(22) Filed: Mar. 9, 2009

(65) Prior Publication Data

US 2009/0186248 A1 Jul. 23, 2009

Related U.S. Application Data

(63) Continuation-in-part of application No. 11/843,861, filed on Aug. 23, 2007.

(60) Provisional application No. 60/840,165, filed on Aug. 25, 2006.

(51) Int. Cl.
*H01M 4/90* (2006.01)
(52) U.S. Cl. .......................... 429/40; 429/42
(58) Field of Classification Search .............. 429/40–42
See application file for complete search history.

(56) References Cited

U.S. PATENT DOCUMENTS

| 4,348,268 | A | 9/1982 | Müller .................... 204/290 R |
| 4,360,417 | A | 11/1982 | Reger et al. .............. 204/290 R |
| 4,454,169 | A | 6/1984 | Hinden et al. ................ 427/125 |
| 4,457,823 | A | 7/1984 | LaConti et al. ............. 204/282 |
| 4,563,261 | A | 1/1986 | Staab et al. ............. 204/290 R |
| 4,589,969 | A | 5/1986 | Yurkov et al. ............ 204/290 F |
| 4,716,087 | A | 12/1987 | Ito et al. ........................ 429/40 |
| 4,956,061 | A | 9/1990 | Dempsey et al. ............. 204/128 |
| 5,242,765 | A | 9/1993 | Naimer et al. ................. 429/42 |
| 5,395,705 | A | 3/1995 | Door et al. .................... 429/42 |
| 5,523,177 | A | 6/1996 | Kosek et al. ................... 429/40 |
| 5,672,439 | A | 9/1997 | Wilkinson et al. ............. 429/40 |

(Continued)

FOREIGN PATENT DOCUMENTS

DE 19709199 9/1998

(Continued)

OTHER PUBLICATIONS

Aricò, A.S., et al., "Electro-chemical and physico-chemical characterization of carbon-supported and unsupported Pt-Ru catalysts for application in direct methanol fuel cells," from the *195th Meeting of the Electrochemical Society*, Meeting Abstracts No. 77, vol. 99-1, May 1999.
Aricò, A.S., et al., "Investigation of direct methanol fuel cells based on unsupported Pt-Ru anode catalysts with different chemical properties," *Electrochimica Acta* 45:4319-4328, 2000.
Boyer, C., et al., "Measurements of proton conductivity in the active layer of PEM fuel cell gas diffusion electrodes," *Electrochimica Acta* 43(24):3703-3709, 1998.

(Continued)

*Primary Examiner*—Mark Ruthkosky
(74) *Attorney, Agent, or Firm*—Seed IP Law Group PLLC

(57) ABSTRACT

An anode catalyst layer for a fuel cell is presented having first and second catalyst compositions and a hydrophobic binder. The first catalyst composition includes a noble metal, other than Ru, on a corrosion-resistant support material; the second catalyst composition contains a single-phase solid solution of a metal oxide containing Ru. The through-plane concentration of ionomer in the catalyst layer decreases as a function of distance from the membrane interface. Gas diffusion electrodes, catalyst-coated membranes, MEAs and fuel cells having the foregoing anode catalyst layer are also described.

3 Claims, 17 Drawing Sheets

U.S. PATENT DOCUMENTS

| | | | |
|---|---|---|---|
| 5,681,435 A | 10/1997 | Joshi et al. | 204/266 |
| 5,871,860 A | 2/1999 | Frost et al. | 429/40 |
| 5,904,832 A | 5/1999 | Clifford et al. | 205/756 |
| 5,945,231 A | 8/1999 | Narayanan et al. | 429/30 |
| 5,998,057 A | 12/1999 | Koschany et al. | 429/42 |
| 6,007,934 A | 12/1999 | Auer et al. | 429/42 |
| 6,017,650 A | 1/2000 | Ramunni et al. | 429/42 |
| 6,066,410 A | 5/2000 | Auer et al. | 429/40 |
| 6,110,861 A | 8/2000 | Krumpelt et al. | 502/326 |
| 6,123,816 A | 9/2000 | Hodgson | 204/290 F |
| 6,171,721 B1 | 1/2001 | Narayanan et al. | 429/41 |
| 6,517,962 B1 | 2/2003 | Knights et al. | 429/13 |
| 6,797,667 B2 | 9/2004 | Ruth et al. | 502/152 |
| 6,838,205 B2 | 1/2005 | Cisar et al. | 429/40 |
| 6,861,387 B2 | 3/2005 | Ruth et al. | 502/184 |
| 6,936,370 B1 | 8/2005 | Knights et al. | 429/40 |
| 7,226,689 B2* | 6/2007 | Ye et al. | 429/40 |
| 2003/0190517 A1 | 10/2003 | Elter et al. | 429/42 |
| 2004/0013935 A1 | 1/2004 | Ye et al. | 429/44 |
| 2004/0157110 A1 | 8/2004 | Knights et al. | 429/44 |
| 2004/0214058 A1 | 10/2004 | Tada et al. | 429/21 |
| 2004/0234839 A1 | 11/2004 | Wakizoe et al. | 429/42 |
| 2005/0003255 A1 | 1/2005 | Shimizu et al. | 429/30 |
| 2005/0147868 A1 | 7/2005 | Takeda et al. | 429/42 |
| 2005/0250002 A1* | 11/2005 | Stanley et al. | 429/44 |
| 2006/0019147 A1 | 1/2006 | Fukuda et al. | 429/44 |
| 2006/0045985 A1 | 3/2006 | Kozak | 427/458 |
| 2006/0105226 A1* | 5/2006 | Kim et al. | 429/40 |

FOREIGN PATENT DOCUMENTS

| | | |
|---|---|---|
| EP | 0 047 595 B1 | 8/1981 |
| EP | 0 443 230 B1 | 8/1994 |
| EP | 0 827 225 A2 | 3/1998 |
| EP | 0 736 921 B1 | 7/1998 |
| EP | 0 716 463 A2 | 6/1999 |
| EP | 0 450 849 B1 | 1/2000 |
| EP | 1 022 795 A1 | 7/2000 |
| EP | 0 872 906 B1 | 10/2000 |
| EP | 0 952 241 B1 | 9/2001 |
| EP | 1 381 102 A2 | 1/2004 |
| EP | 1 626 451 A1 | 2/2006 |
| GB | 1 484 015 | 8/1977 |
| GB | 2 309 230 A | 7/1997 |
| JP | 59225740 | 12/1984 |
| JP | 60-162787 | 8/1985 |
| JP | 62-024568 | 2/1987 |
| JP | 62-154571 | 7/1987 |
| JP | 1246765 | 10/1989 |
| JP | 2049356 | 2/1990 |
| JP | 2179891 | 7/1990 |
| JP | 3022361 | 1/1991 |
| JP | 07-090111 | 4/1995 |
| JP | 09-035723 | 2/1997 |
| JP | 09-035736 | 2/1997 |
| JP | 10-055807 | 2/1998 |
| JP | 10-270057 | 10/1998 |
| JP | 11-021687 | 1/1999 |
| JP | 2000-000467 A | 1/2000 |
| JP | 2000-003712 | 1/2000 |
| JP | 2000-342965 | 12/2000 |
| JP | 2001-143714 | 5/2001 |
| JP | 2002-289201 | 10/2002 |
| JP | 2005-174869 | 6/2005 |
| JP | 2005-302554 | 10/2005 |
| WO | 99/53557 A1 | 10/1999 |
| WO | 01/15247 A2 | 3/2001 |
| WO | 01/15254 A2 | 3/2001 |
| WO | 01/15255 A2 | 3/2001 |
| WO | 2004/010521 A2 | 1/2004 |
| WO | 2004/095603 A2 | 11/2004 |

OTHER PUBLICATIONS

"Film deposition techniques," Kirk-Othmer, Encyclopedia of Chemical Technology, 3$^{rd}$ edition, J. Wiley & Sons, vol. 10, 2002, pp. 248-249.

Hamnett, A., et al., "Nafion®-bonded porous titanium oxide electrodes for oxygen evolution towards a regenerative fuel cell," *Journal of Applied Electrochemistry* 21:982-985, 1991.

Iwase, M., et al., "Optimized CO tolerant electrocatalysts for polymer electrolyte fuel cells," *Electrochemical Society Proceedings* 95(23):12-23.

Kinoshita, K., *Carbon: Electrochemical and Physicochemical Properties*, J. Wiley & Sons Inc., NY, USA, 1988, 7.1.1 Impregnation, "Application of carbon in electrochemical systems," 390-391.

Kordesch et al., *Fuel Cells and Their Applications*, CVH Publishers Inc, 1996, 4.3.5., "Polymer electrolyte fuel cell stacks," 90-93.

Ledjeff, K., et al., "Development of Pressure Electrolyser and Fuel Cell with Polymer Electrolyte," *Int. J. Hydrogen Energy* 19(5):453-455, 1994.

Marr, C., et al., "Composition and performance modeling of catalyst layer in a proton exchange membrane fuel cell," *Journal of Power Sources* 77:17-27, 1999.

Nartey, V. K., et al., "Overcharge protection for the $MnO_2$ cathode in alkaline $Zn-MnO_2$ batteries," *Ghana Journal of Chemistry* 3(1):7-10, 1997.

Niedrach, L. W., et al., "Electrocatalysts for Hydrogen/Carbon Monoxide Fuel Cell Anodes," *Electrochemical Technology* 5(7-8):318-323, Jul.-Aug. 1997.

Piela, P., et al., "Ruthenium Crossover in Direct Methanol Fuel Cell with Pt-Ru Black Anode," *Journal of The Electrochemical Society* 151(12):A2053-A2059, 2004.

Ralph, T.R., et al., "Catalysis for Low Temperature Fuel Cells," *Platinum Metals Rev.* 46(3):117-135, 2002.

Ralph, T.R., et al., "Low Cost Electrodes for Proton Exchange Membrane Fuel Cells," *J. Electrochem. Soc.* 144(11):3845-3857, Nov. 1997.

"Regenerative Fuel Cell Subsystems," Chemistry 869, Course in Electrochemistry at Simon Fraser University, Nov. 1996, pp. 1-12.

Rolision, D., et al., "Role of Hydrous Ruthenium Oxide in Pt-Ru Direct Methanol Fuel Cell Anode Electrocatalysts: The Importance of Mixed Electron/Proton Conductivity," *Langmuir* 15:774-779, 1999.

Savadogo, O., "New Materials for Water Electrolysis and Photoelectrolysis," *Hydrogen Energy World Conference*, pp. 2065-2092, 1996.

Scott, K., et al., "Engineering aspects of the direct method fuel system," *Journal of Power Sources* 79:43-59, 1999.

Stucki, S., et al., "Evaluation of Materials for a Water Electrolyzer of the Membrane Type," Brown Boveri Research Centre, Switzerland, pp. 1799-1808. (Date unknown).

Taniguchi, A., et al., "Analysis of electrocatalyst degradation in PEMFC caused by cell reversal during fuel starvation," *Journal of Power Sources* 130: 42-49, 2004.

Wang, J-T., et al., "Simulation studies on the fuel electrode of a $H_2$-$O_2$ polymer electrolyte fuel cell," *Electrochimica Acta* 37(15):2737-2745, 1992.

Wilkinson, D., et al., "Materials and Approachs for CO and $CO_2$, Tolerance for Polymer Electrolyte Membrane Fuel Cells," New Materials for Fuel Cell and Modern Battery Systems II, *Proceedings of the 2$^{nd}$ International Symposium on New Materials for Fuel cell & Modern Battery Systems*, 11 pages having 2 columns of text per page, 1997.

Zhigang, S., et al., "Bifunctional electrodes with a thin catalyst layer for 'unitized' proton exchange membrane regenerative fuel cell," *Journal of Power Sources* 79:82-85, 1999.

U.S. Appl. No. 60/872,444, filed Apr. 21, 2006 in the name of Mah et al.

* cited by examiner

FUEL CELL ANODE STRUCTURE FOR VOLTAGE REVERSAL TOLERANCE

BACKGROUND

1. Technical Field

The present invention relates to an anode for use in PEM fuel cells, and to fuel cells comprising said anode, having improved tolerance to voltage reversal.

2. Description of the Related Art

Fuel cell systems are currently being developed for use as power supplies in numerous applications, such as automobiles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells ("PEM fuel cell") employ a membrane electrode assembly ("MEA"), which comprises a solid polymer electrolyte or ion-exchange membrane disposed between the two electrodes, namely a cathode and an anode. A catalyst typically induces the desired electrochemical reactions at the electrodes. Separator plates, or flow field plates for directing the reactants across one surface of each electrode substrate, are disposed on each side of the MEA.

In operation, the output voltage of an individual fuel cell under load is generally below one volt. Therefore, in order to provide greater output voltage, multiple cells are usually stacked together and are connected in series to create a higher voltage fuel cell stack. (End plate assemblies are placed at each end of the stack to hold the stack together and to compress the stack components together. Compressive force effects sealing and provides adequate electrical contact between various stack components.) Fuel cell stacks can then be further connected in series and/or parallel combinations to form larger arrays for delivering higher voltages and/or currents.

In practice, fuel cells need to be robust to varying operating conditions, especially in applications that impose numerous on-off cycles and/or require dynamic, load-following power output, such as automotive applications. For example, fuel cell anode catalysts are also preferably tolerant to cell voltage reversals; carbon-supported catalysts are also preferably resistant to corrosion during start up and shutdown procedures.

PEM fuel cells typically employ noble metal catalysts, and it is well known that such catalysts, particularly platinum, are very sensitive to carbon monoxide poisoning. This is a particular concern for the anode catalyst of fuel cells operating on reformate; but it also a concern for fuel cells operating on hydrogen, as CO is sometimes present in the hydrogen supply as a fuel contaminant and/or as a result of membrane crossover from the oxidant supply in applications where air is employed. As described by, e.g., Niedrach et al. in *Electrochemical Technology*, Vol. 5, 1967, p. 318, the use of a bimetallic anode catalyst comprising platinum/ruthenium, rather than monometallic platinum, shows a reduction in the poisoning effect of the CO at typical PEM fuel cell operating temperatures. Hence, Pt—Ru catalysts are typically employed as PEM fuel cell anode catalysts.

The anode layer of PEM fuel cells typically includes catalyst and binder, often a dispersion of polytetrafluoroethylene (PTFE) or other hydrophobic polymer, such as described in U.S. Pat. No. 5,395,705, and may also include a filler (e.g., carbon). Anode layers are also described that comprise catalyst and an ionomer (e.g., U.S. Pat. No. 5,998,057) and a mixture of catalyst, ionomer and binder (e.g., U.S. Pat. No. 5,242,765). The presence of ionomer in the catalyst layer effectively increases the electrochemically active surface area of the catalyst, which requires an ionically conductive pathway to the cathode catalyst to generate electric current.

Voltage reversal occurs when a fuel cell in a series stack cannot generate sufficient current to keep up with the rest of the cells in the series stack. Several conditions can lead to voltage reversal in a PEM fuel cell, for example, including insufficient oxidant, insufficient fuel, insufficient water, low or high cell temperatures, and certain problems with cell components or construction. Reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the affected fuel cell, and in turn, its associated stack and array.

One approach for improving cell reversal tolerance is to employ a catalyst that is more resistant to oxidative corrosion, by using higher catalyst loading or coverage on the anode catalyst support or a more oxidation resistant anode catalyst support, such as a more graphitic carbon or $Ti_4O_7$, as described in U.S. 2004/0157110. Conversely, U.S. 2006/0019147 discloses a catalyst layer where Pt and/or Pt alloy powder and carbon powder exist independently from each other.

As described in U.S. Pat. No. 6,936,370, fuel cells can also be made more tolerant to cell reversal by promoting water electrolysis over anode component oxidation at the anode. This can be accomplished by incorporating an additional catalyst composition at the anode to promote the water electrolysis reaction. During reversal, water present in the anode catalyst layer can be electrolyzed and oxidation (corrosion) of anode components, including carbon catalyst supports, if present, can occur. It is preferred to have water electrolysis occur rather than component oxidation. Thus, by incorporating a catalyst composition that promotes the electrolysis of water, more of the current forced through the fuel cell during voltage reversal can be consumed in the electrolysis of water than the oxidation of anode components. Among the catalyst compositions disclosed were Pt—Ru alloys, $RuO_2$ and other metal oxide mixtures and/or solid solutions including Ru.

U.S. 2004/0013935 also describes an approach to improving cell voltage reversal tolerance by using anodes employing both a higher catalyst loading (at least 60 wt % catalyst) on an optional corrosion-resistant support, and incorporating certain unsupported catalyst compositions to promote the water electrolysis reaction. Disclosed preferred compositions include oxides characterized by the chemical formulae $RuO_x$ and $IrO_x$, where x is greater than 1 and particularly about 2, and wherein the atomic ratio of Ru to Ir is greater than about 70:30, and particularly about 90:10.

However, Ru has been shown to be unstable under certain fuel cell operating conditions. For example, Piela et al. (*J. Electrochem. Soc.*, 151 (12), A2053-A2059 (2004)), describe Ru crossover from Pt—Ru black catalyst and redeposition at the Pt cathode catalyst in direct methanol fuel cells (DMFC) and hydrogen/air fuel cells under abnormal conditions, such as cell reversal resulting in very high anode potentials (and under normal DMFC operating conditions). Piela et al. theorized that the Pt—Ru alloy should likely remain stable under DMFC operating conditions, and that the source of the Ru contamination was neutral hydrous $RuO_2$. Taniguchi et al. (*J. Power Sources,* 130, 42-49 (2004)) observed Ru dissolution from a carbon supported Pt—Ru anode catalyst as a result of high anode potentials experienced by the fuel cell under cell reversal conditions. Unlike Piela et al., Taniguchi et al. did not detect Ru in the membrane or cathode side of the fuel cells tested.

In contrast, U.S. 2004/0214058 discloses that the increase in anode potential during fuel shortage causes the formation of some film on the surface of the catalyst that reduces its activity. A multilayered electrode structure is proposed in which a layer for preferentially promoting the electrolysis of water during fuel shortage is provided so as to prevent the occurrence of water electrolysis in the region for advancing the fuel cell reaction, as a means for suppressing the observed performance reduction. The embodiments disclosed in US 2004/0214058 employ a Pt—Ru catalyst in the reaction layer, and a Pt catalyst in the water decomposition layer.

It is desirable to have a fuel cell anode that is more robust to operating conditions that impose numerous on-off cycles and/or require dynamic, load-following power output; are tolerant to cell voltage reversals; and resistant to corrosion during start up and shutdown procedures. The present invention addresses this need and provides associated benefits.

BRIEF SUMMARY

In brief, an electrode assembly for a fuel cell is provided, the electrode assembly comprising an electrolyte interposed between an anode and cathode, a cathode catalyst layer interposed between the electrolyte and the cathode, and an anode catalyst layer interposed between the electrolyte and the anode. The anode layer comprises a first catalyst composition comprising a noble metal, other than Ru, on a corrosion resistant support material; a second catalyst composition consisting essentially of a single-phase solid solution of a metal oxide containing Ru; and a hydrophobic binder, and wherein a through-plane concentration of an ionomer in the catalyst layer decreases as a function of distance from the electrolyte.

In a further embodiment, a catalyst-coated membrane is provided, the catalyst coated membrane comprising a polymer electrolyte membrane, a cathode catalyst layer on at least a portion of a first major surface thereof, and an anode catalyst layer on at least a portion of a second major surface thereof. The anode catalyst layer comprises a first catalyst composition comprising a noble metal, other than Ru, on a corrosion resistant support material; a second catalyst composition consisting essentially of a single-phase solid solution of a metal oxide containing Ru; and a hydrophobic binder, and wherein a through-plane concentration of an ionomer in the catalyst layer decreases as a function of distance from the membrane.

In still a further embodiment, a fuel cell stack is provided, the fuel cell stack comprising a plurality of fuel cells, the fuel cells each comprising an electrode assembly as discussed above.

These and other aspects of the invention are evident upon reference the attached drawings and following detailed description.

DETAILED DESCRIPTION

Figure 1:
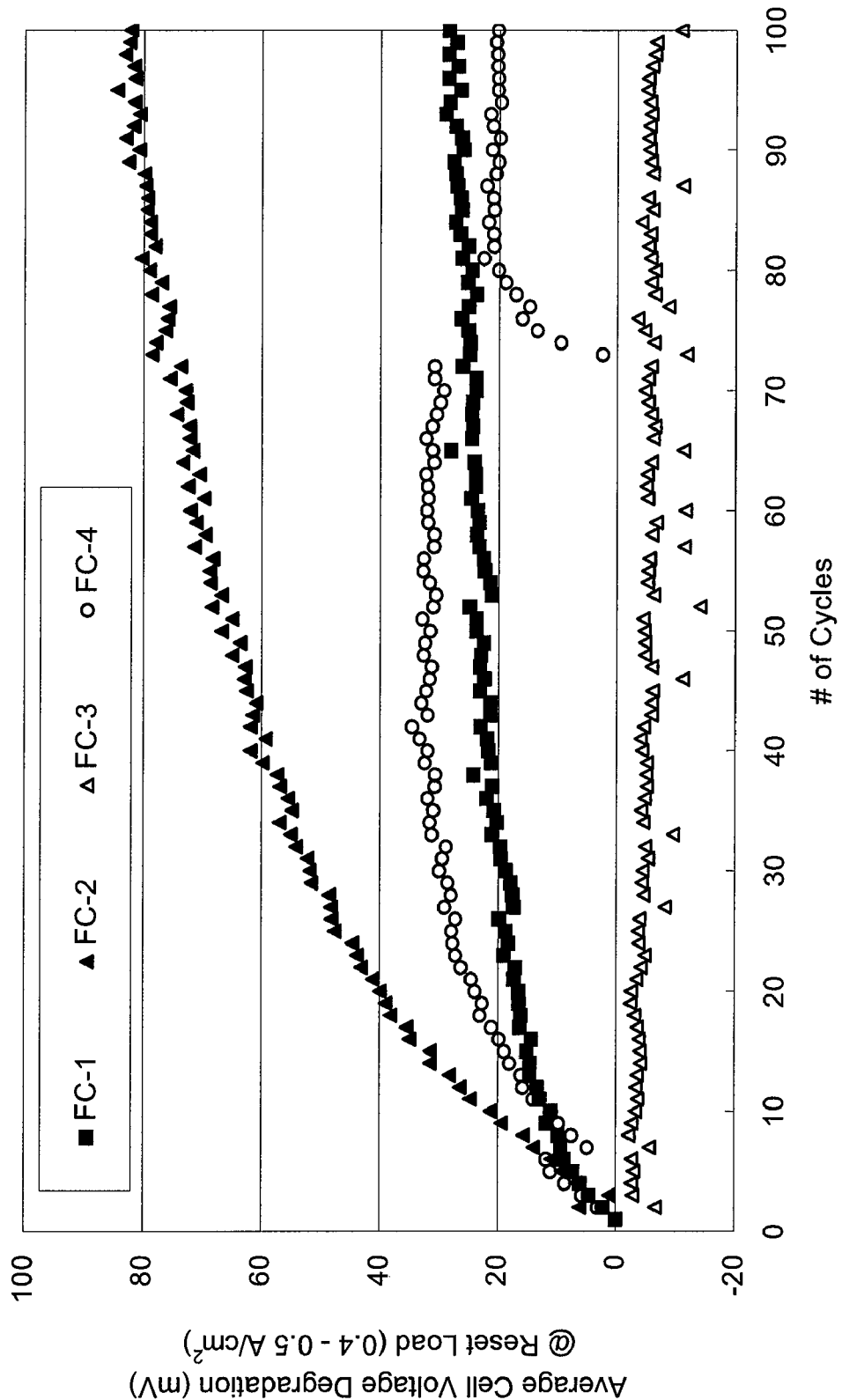
FIG. 1 is a graph of the average cell voltage degradation as a function of 100 start/stop cycles for fuel cell stacks tested under various operating conditions.

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is, as "including, but not limited to."

A "corrosion resistant support material" is at least as resistant to oxidative corrosion as Shawinigan acetylene black (Chevron Chemical Company, Tex., USA).

As discussed, Pt—Ru catalysts are typically employed as PEM fuel cell anode catalysts because they exhibit fuel oxidation activity similar to Pt catalysts and further provide greater CO tolerance. Fuel cell anode compositions including $RuO_x$ are also employed to provide for greater cell voltage reversal tolerance. However, applicant has surprisingly discovered that such anode catalysts may be less than desirable in applications that impose numerous on-off cycles and/or require dynamic, load-following power output, such as automotive applications.

COMPARATIVE EXAMPLES

Start/Stop Cycle Testing

Several stacks were tested under operating conditions that simulated various start/stop duty cycles. The test conditions also simulated the use of hydrogen and air as reactants and anode recirculation.

Stacks FC-1 FC-2 FC-3 and FC-4

Each fuel cell stack comprised 20 Ballard Mk 1100 fuel cells, each comprising an MEA interposed between graphite bipolar flow field plates. The MEAs were composed of Nafion® NRE-211 membrane (DuPont Fuel Cells, N.C., USA) bonded to two gas diffusion electrodes (GDEs), i.e., the anode and cathode. Both GDEs were composed of teflonated carbon fiber paper (TGP-H-060; Toray Composites (America) Inc., WA, USA) having a carbon sublayer comprising carbon particles and PTFE applied to one surface at a loading of ~2.5 mg C/cm$^2$ and 1.2 mg C/cm$^2$ for the anode and cathode, respectively. The catalyst applied to the carbon sublayer was:

TABLE 1

MEA catalyst composition for FC-1-FC-4 stack

| GDE | Catalyst composition | Catalyst loading |
| --- | --- | --- |
| Anode | Catalyst (88%): 40%/20% Pt—Ru supported on acetylene black carbon (Johnson Matthey Plc, London, UK)*; Binder (12%): PTFE | ~0.25-0.35 mg Pt/cm$^2$ |
| Cathode | Catalyst (67%): 50% Pt supported on graphitized carbon black (Tanaka Kikinzoku Kogyo KK (TKK), Tokyo, JP) Ionomer (33%): Nafion ® | ~0.7-0.8 mg Pt/cm$^2$ |

*The catalyst also contains some RuO$_x$ and possibly Ru(OH)$_x$ (discussed further below).

A 0.2 mg/cm$^2$ Nafion® spraycoat was applied to the anode catalyst layer before bonding the MEA.

Duty Cycle 1

Stack FC-1 was tested according to Duty Cycle 1.

Steady State

Temperature 65° C. (coolant inlet)-70° C. (coolant outlet)

Inlet Dew Point 50-60° C. (fuel and oxidant)

Fuel 60% hydrogen, 40% nitrogen

Oxidant 21% oxygen, 79% nitrogen

Reactant inlet pressure 2.0 bara (fuel), 1.6 bara (oxidant)

Reactant stoichiometries 1.7 (fuel), 1.8 (oxidant)

Shutdown

The load was slowly ramped down to about 31 A while slowly decreasing the fuel and oxidant pressure. The 31 A load was held until the fuel pressure reached about 1.4 bara, and then was decreased to about 8 A. The fuel flow was shut off and anode recirculation maintained. When the fuel pressure reached about 1.25 bara, the load was disconnected and the oxidant supply turned off, although the cathode exhaust was left open to ambient. Anode recirculation was discontinued after the load was disconnected, and the fuel cell stack was cooled to 20° C. The stack remained shut down for about 30 minutes before starting the next start-stop cycle. During shutdown, air was allowed to flow through the cathode, and the anode/cathode purge valve was opened periodically to permit air to enter the anode.

Startup

The anode recirculation pump was started and fuel supplied to the stack at ~0.3 barg. Fuel and oxidant were then supplied to the stack at pressures of about 1.3 bara and ambient, respectively. The load was applied and increased by 6.26 A/sec until a target load of 156 A was reached. At the same time, reactant stoichiometries, pressures and humidification levels were slowly increased to their steady state target values.

Duty Cycle 2

FC-2 was tested according to Duty Cycle 2. The steady state and startup conditions were identical to those described for Duty Cycle 1, above. The shutdown conditions were also the same as described for Duty Cycle 1, except that: the cathode exhaust was closed to ambient; and after the forced cooling to 20° C., a 1 A bleed-down current was applied to remove the H$_2$ from the anode.

Duty Cycle 3

FC-3 was tested according to Duty Cycle 3. The steady state and startup conditions were identical to those described for Duty Cycle 1, above. The shutdown conditions were also the same as described for Duty Cycle 1, except that the fuel was supplied to the stack to ensure the presence of hydrogen in the anode flow fields throughout the shutdown period.

Duty Cycle 4

FC-4 was tested according to Duty Cycle 4 to determine whether rapid purging of the anode flow fields was effective to prevent performance degradation with Pt—Ru anode catalysts. The steady state and startup conditions were identical to those described for Duty Cycle 1, above.

On shutdown, the load was slowly ramped down to about 31 A while slowly decreasing the fuel and oxidant pressure. The 31 A load was held until the fuel pressure reached about 1.4 bara, and then was decreased to about 8 A. The fuel flow was shut off and anode recirculation maintained. A bleed-down load was applied for approximately 20 seconds while oxidant supply to the stack was maintained. The bleed-down load was disconnected and the fuel purge valve and a valve between the anode and cathode manifolds were opened to complete removal of H$_2$ from the anode side of the stack. The recirculation pump was shutdown shortly after purging, and the stack was force cooled to 20° C. FC-4 was subjected to 75 cycles.

FIG. 1 is a graph of the average cell voltage degradation as a function of 100 start/stop cycles for fuel cell stacks FC-1, FC-2, and FC-3 and 75 cycles for stack FC-4. FC-3 was run with hydrogen in the anode flow fields throughout the duty cycle as a control to eliminate start-up conditions that prevent known cathode catalyst corrosion issues resulting from the presence of a hydrogen/air (nitrogen) front moving across the anode flow field (discussed above). As expected, no performance degradation was observed for FC-3. Unfortunately, in many applications, such as automotive applications where there is considerable time between shutdowns and subsequent start-ups, it is not practical to maintain hydrogen in the anode flow fields, due to unacceptable fuel losses and/or concerns about keeping the fuel supply open or actively controlling fuel supply when the vehicle is not in operation.

Conversely, the FC-1 and FC-2 duty cycles reflected more typical conditions for fuel cells in applications where there is considerable time between shutdowns and subsequent start-ups, such as automotive applications; in particular, a hydrogen/air (nitrogen) front moving across the anode flow field was generated on start-up. As clearly shown in FIG. 1, the cell voltage degradation for FC-1, and particularly FC-2, were significant. Indeed, the observed degradation was higher than expected and could not be explained primarily on the basis of cathode catalyst corrosion, as the cathode catalyst employed had previously exhibited satisfactory corrosion resistance.

The voltage degradation exhibited by FC-4 was also surprising, as the ramp rate sensitivity data for Samples 5 and 6 (discussed below) suggested that a more rapid purge of the anode flow fields by hydrogen might have mitigated performance loss by increasing the ramp rate of the anode potential transient and thereby decreasing the amount of Ru crossover. Surprisingly however, FC-4 initially exhibited greater voltage degradation than FC-1, although it recovered some performance by the end of 75 cycles. This data suggests that a rapid anode purge may not be a desirable operational solution to the problems of Ru crossover caused by transient anode potentials during start up.

Cross-sections of low-performing cells from FC-1 and FC-2 were analyzed by SEM, though performance loss was not attributable to structural changes visible in the micrographs. Without being bound by theory, further analysis indicated that the cause of the performance degradation was Ru crossover from the anode catalyst, resulting in contamination of the cathode catalyst and interference with the oxygen reduction kinetics.

Ru Crossover Mechanisms

The anode was found to experiences relatively high (>1.2 V) transient voltages during start up under conditions such as those experienced under Duty Cycles 1 and 2 (data not shown). Again, without being bound by theory, based on the identified anode potential transients during start/stop cycling, and standard reduction potentials at 25° C. for various Ru species, the following mechanisms are suggested for Ru crossover from the anode.

Figure 2A:
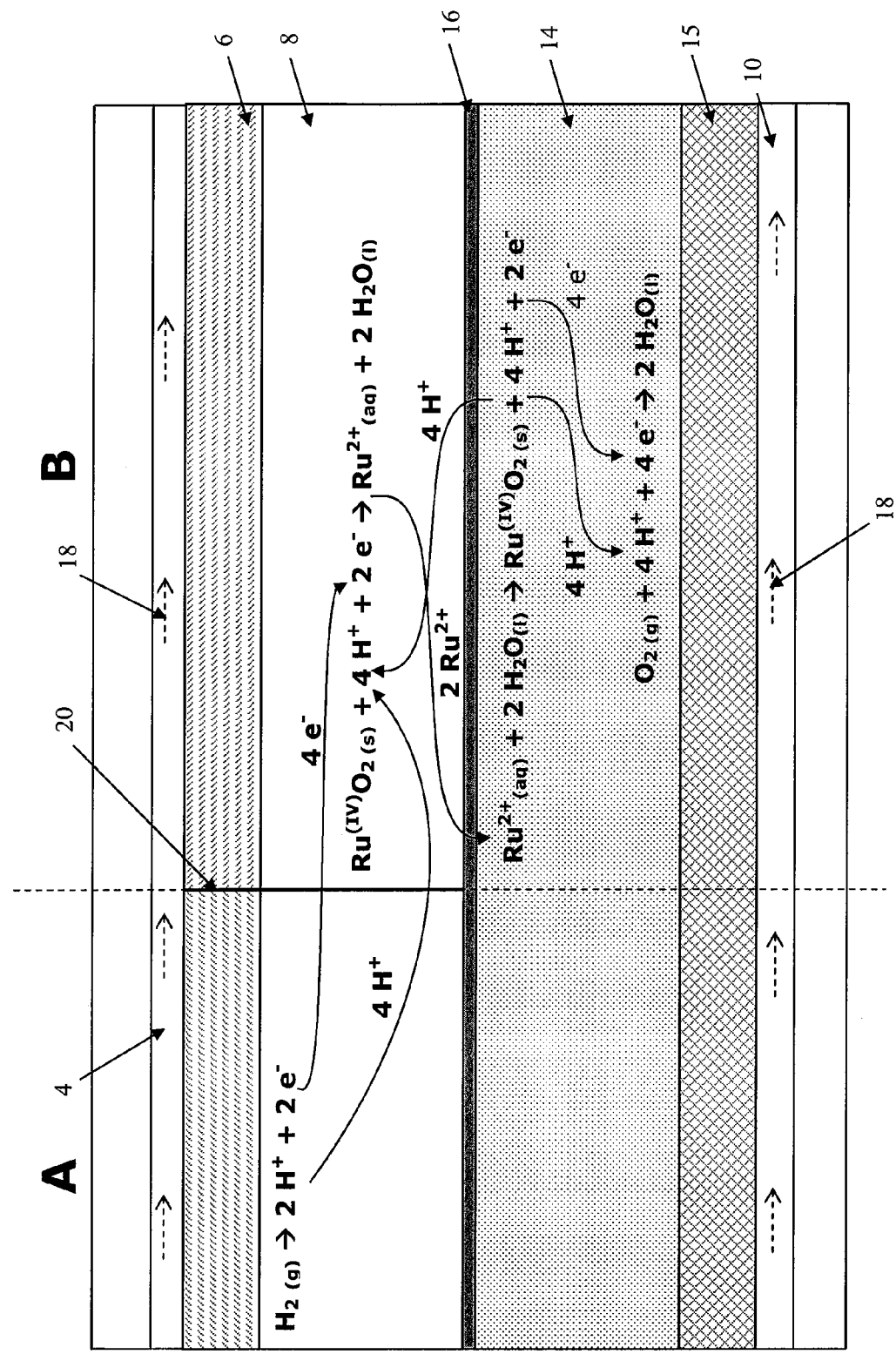
FIGS. 2a and 2b are schematic representations in cross-section of a PEM fuel cell.
Figure 2B:
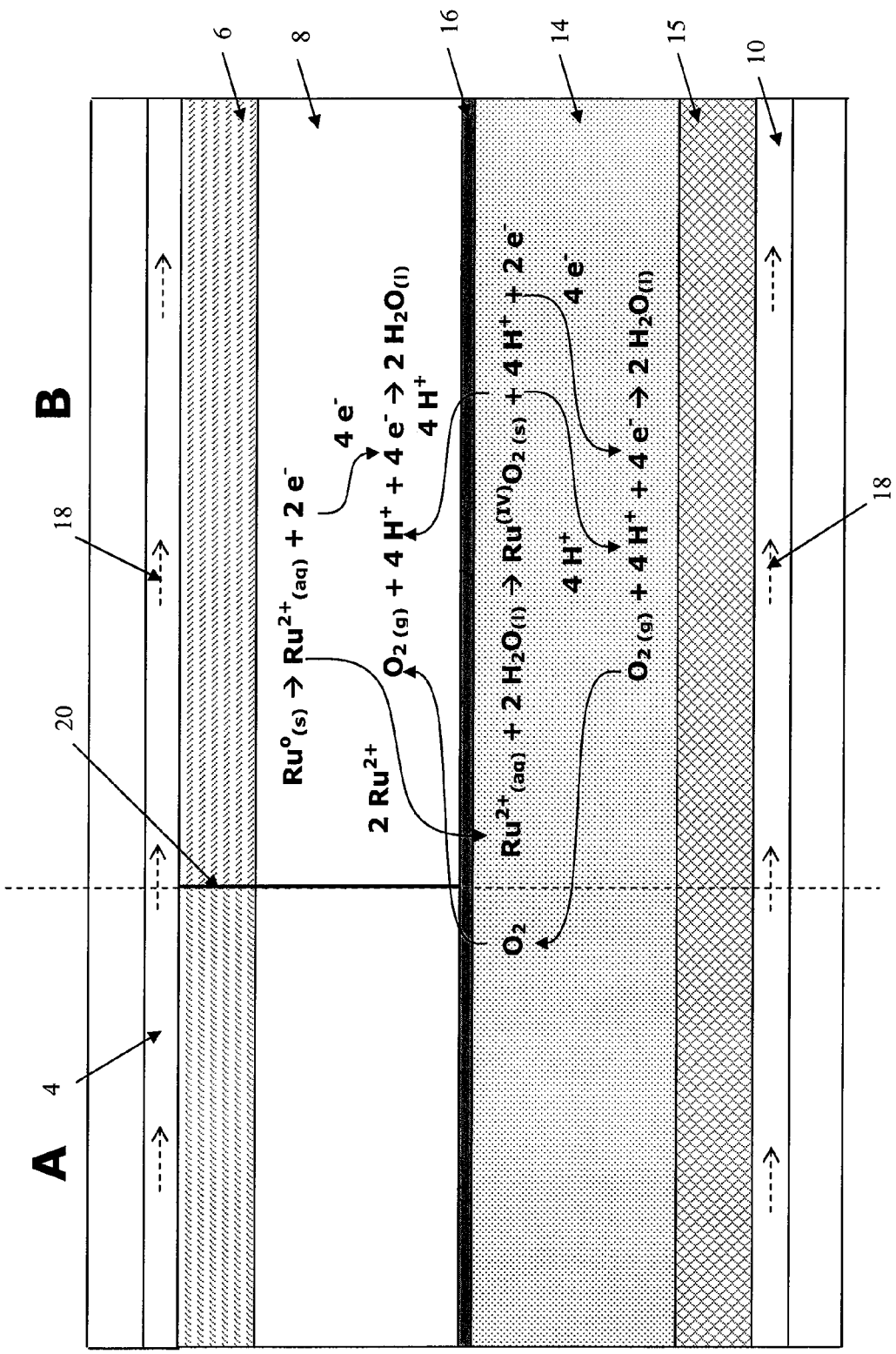

The migration of Ru from the anode to cathode catalyst layers will be described with reference to FIGS. 2a and 2b. FIGS. 2a and 2b are schematic representations in cross-section of PEM fuel cell 2, which comprises anode flow field 4, GDL 6 and catalyst layer 8; cathode flow field 10, GDL 12 and catalyst layer 14; and PEM 16.

On shutdown hydrogen and air in the respective anode flow field 4 and cathode flow field 10 diffuse across PEM 16 (each to the opposite side of the cell) and react on the catalyst layers 8, 14 (with either oxygen or hydrogen, as the case may be) to form water. The consumption of hydrogen on the anode lowers the pressure in anode flow field 4 to below ambient pressure, resulting in external air being drawn into it, either upstream or downstream of anode flow field 4, or by diffusion across PEM 16 from cathode flow field 10. Eventually anode flow field 4 is filled with oxygen-depleted air, essentially $N_2$ for present purposes.

On start-up of the cell, hydrogen and air are directed into and through anode and cathode flow fields 4, 10, respectively, in the direction indicated by dashed arrow 18. On the anode side of the cell this results in the creation of a hydrogen/nitrogen front (represented by solid line 20) that moves across the anode through anode flow field 4, displacing the nitrogen in front of it, which is pushed out of the cell.

The presence of both hydrogen and air within anode flow field 4 results in a shorted cell between the portion of the anode that sees hydrogen and the portion of the anode that sees nitrogen. This generates a transient increase in anode potential in region B not exposed to hydrogen, and also in cathode potential in the same region.

The mechanism for migration of Ru via the oxidation of $RuO_2$ will be described with reference to FIG. 2a. The electrode potentials for the anode and cathode as the hydrogen front moves through the cell can be described as:

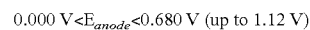
0.000 V<$E_{anode}$<0.680 V (up to 1.12 V)

1.120 V<$E_{cathode}$<1.228 V

In region A of anode catalyst layer 8, hydrogen generates $H^+$ and $e^-$ according to the standard reaction:

$H_{2(g)} \rightarrow 2H^+ + 2\,e^-$  E°~0.000 (1)

In region B, RuO2 is oxidized to Ru

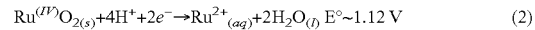
$Ru^{(IV)}O_{2(s)} + 4H^+ + 2e^- \rightarrow Ru^{2+}_{(aq)} + 2H_2O_{(l)}$  E°~1.12 V (2)

The $Ru^{2+}$ ions migrate through PEM 16, where the following reactions occur in region B of cathode catalyst layer 14:

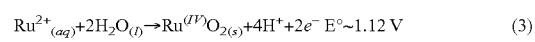
$Ru^{2+}_{(aq)} + 2H_2O_{(l)} \rightarrow Ru^{(IV)}O_{2(s)} + 4H^+ + 2e^-$  E°~1.12 V (3)

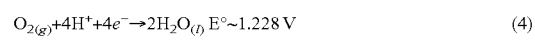
$O_{2(g)} + 4H^+ + 4e^- \rightarrow 2H_2O_{(l)}$  E°~1.228 V (4)

The curved arrows in FIG. 2a indicate the flow of ions and electrons within and between the anode and catalyst layers 8, 14. This set of reactions occurs when fuel cell 2 is not connected to an external electrical load and is current driven. The net result is the migration of $Ru^{2+}$ ions through PEM 16 and the formation of $RuO_2$ in cathode catalyst layer 14.

The mechanism for migration of Ru via the reduction of $Ru^0_{(s)}$ will be described with reference to FIG. 2b. The electrode potentials for anode and cathode as the hydrogen front moves through the cell can be described as:

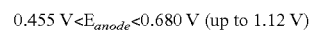
0.455 V<$E_{anode}$<0.680 V (up to 1.12 V)

1.120 V<$E_{cathode}$<1.228 V

The following reactions occur in region B of anode catalyst layer 8:

$Ru^0_{(s)} \rightarrow Ru^{2+}_{(aq)} + 2e^-$  E°~0.455 V (5)

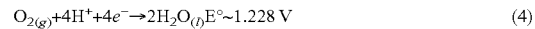
$O_{2(g)} + 4H^+ + 4e^- \rightarrow 2H_2O_{(l)}$  E°~1.228 V (4)

The $Ru^{2+}$ ions migrate through PEM 16, where reactions (3) and (4) occur in region B of cathode catalyst layer 14, as described with reference to FIG. 2a, above. The curved arrows in FIG. 2b indicate the flow of ions and electrons within and between the anode and catalyst layers 8, 14. This set of reactions also occurs when fuel cell 2 is not connected to an external electrical load; however, they are potential driven. Again, the net result is the migration of $Ru^2$ ions through PEM 16 and the formation of $RuO_2$ in cathode catalyst layer 14.

Further data in support of Ru crossover as the source of the observed performance loss in the start/stop cycling tests is provided below.

CO Stripping Cyclic Voltammetry

The electrochemical stability of the anode catalyst in fuel cells before and after duty cycle testing was determined by carbon monoxide stripping cyclic voltammetry (CO stripping CV). Sample 1 was an unused fuel cell assembled as described in FC-1 through FC-4, above. Sample 2 was a fuel cell taken from stack FC-2 after duty cycling as described (above).

The sample fuel cells were conditioned by drawing 294.4 A for 1 hour while supplying air and hydrogen at 2.0 and 1.5 stoichiometries, respectively, at 100% RH and 2.0 bara pressure for both reactants. Coolant was supplied at an inlet temperature of 70° C. and an outlet temperature of 80° C. After conditioning, hydrogen and nitrogen were supplied to the anode and cathode, respectively, at about 7.5 slpm and about 1.0 slpm, respectively, for 10 minutes. A PAR EG&G 273 potentiostat (Princeton Applied Research, Princeton, N.J.) with an EPCO 20 A power booster (Engineered Products Co., MN, USA) and Corrware software (Scribner Associates Inc., NC, USA) was hooked up to the fuel cell with the cathode as the working electrode. The cyclic voltammogram sweep rate was set at 20 mV/sec and sweep potential range from 0.1 to 1.2V, and was swept two times. The oxidant gases were then switched to 1% CO/99% nitrogen and supplied for 2 minutes to the cathode. The oxidant gases were then switched back to pure nitrogen for 5 minutes and then swept twice using the same sweep rate and sweep potential.

Figure 3:
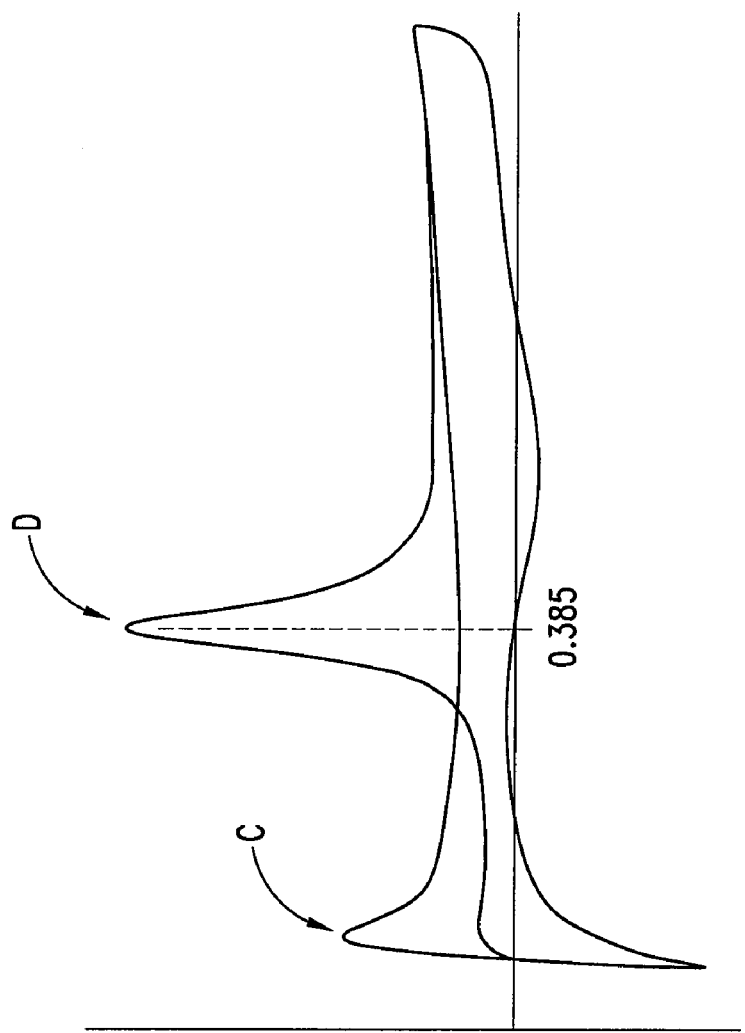
FIG. 3 is a BOL carbon monoxide stripping cyclic voltammogram for a PEM fuel cell anode.
Figure 4:
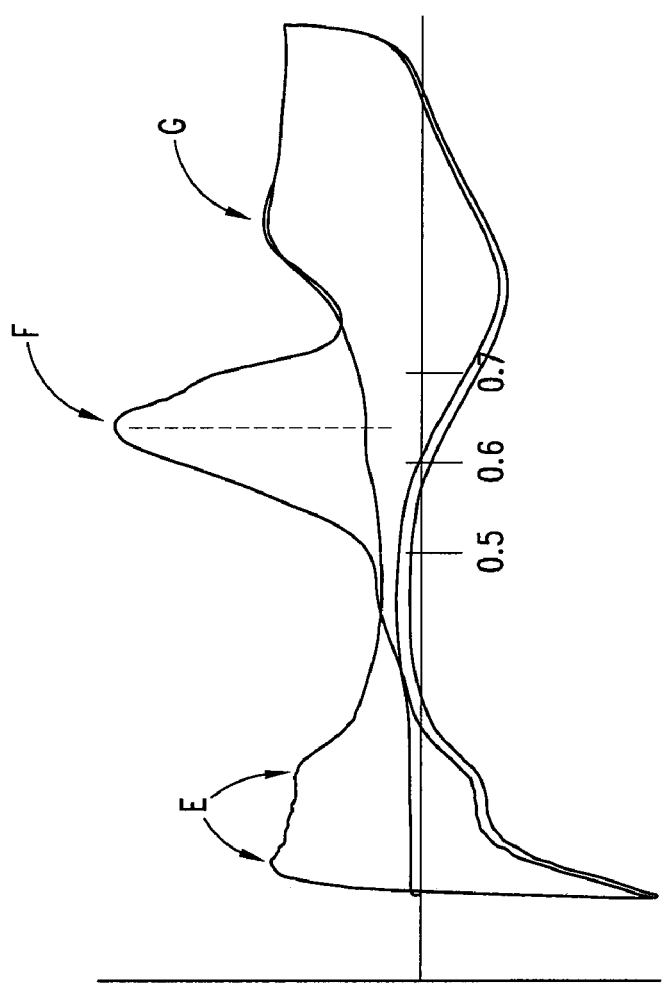
FIG. 4 is a BOL carbon monoxide stripping cyclic voltammogram for a PEM fuel cell cathode.

The resulting anode and cathode voltammograms for Sample 1 are illustrated in FIGS. 3 and 4, respectively, and are representative of "beginning of life" (BOL) data for these anode and cathode catalysts.

The Pt—Ru alloy anode catalyst in FIG. 3 has a characteristic single $H_2$ desorption peak (C) and CO adsorption peak at <0.5V (D). FIG. 4 has characteristic peaks for the corresponding Pt cathode catalyst: two $H_2$ desorption peaks (E), with the lower potential peak usually higher than the higher potential peak; a CO adsorption peak at 0.6-0.7 V (F); and a Pt—O peak (G). In both figures, double layer charging current region ($I_{dl}$) is a measure of capacitance and is measured as the distance between oxidative and reductive sweeps at 0.4 V.

Figure 5:
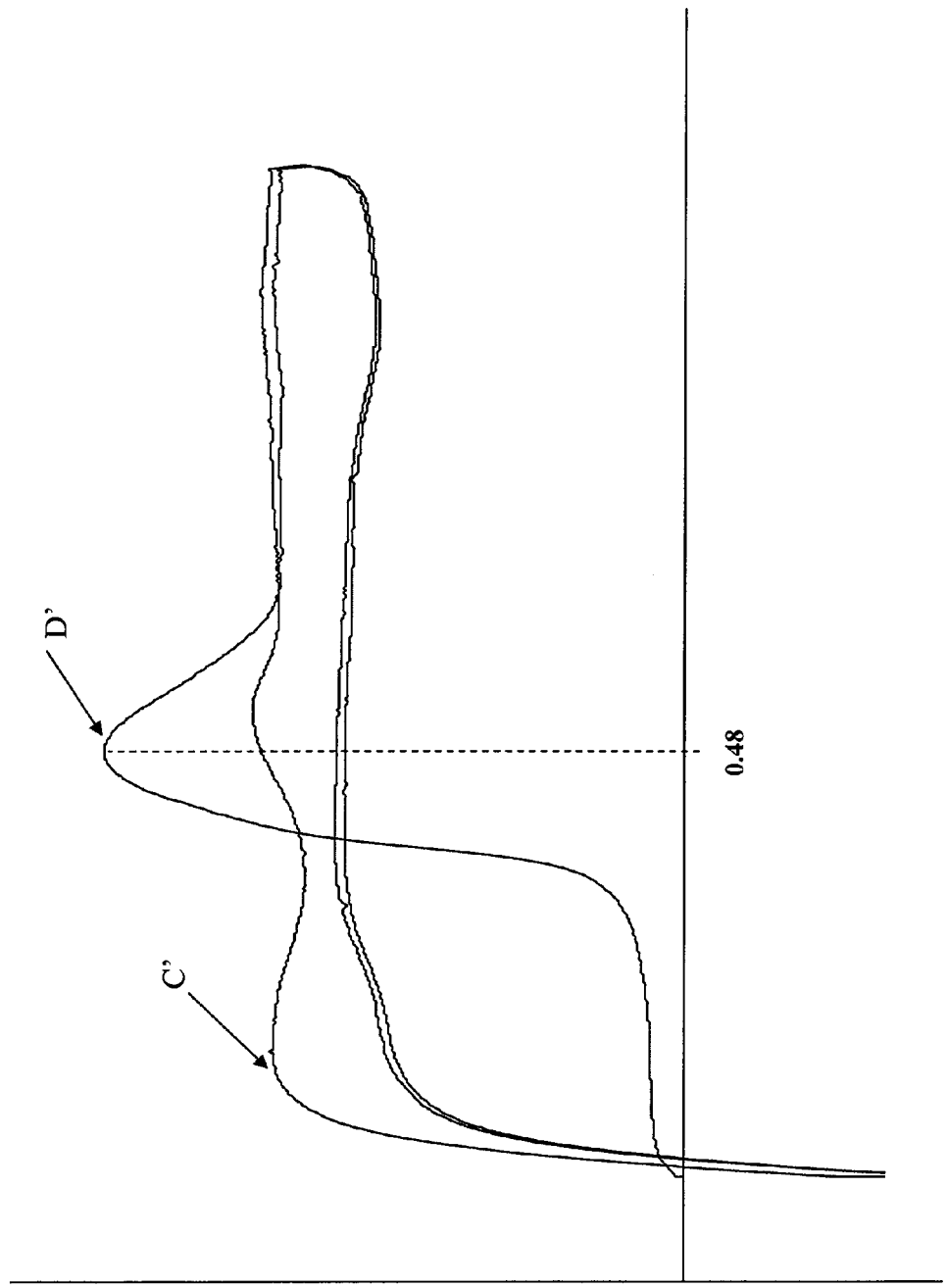
FIG. 5 is a carbon monoxide stripping cyclic voltammogram for a PEM fuel cell anode after start/stop duty cycling.
Figure 6:
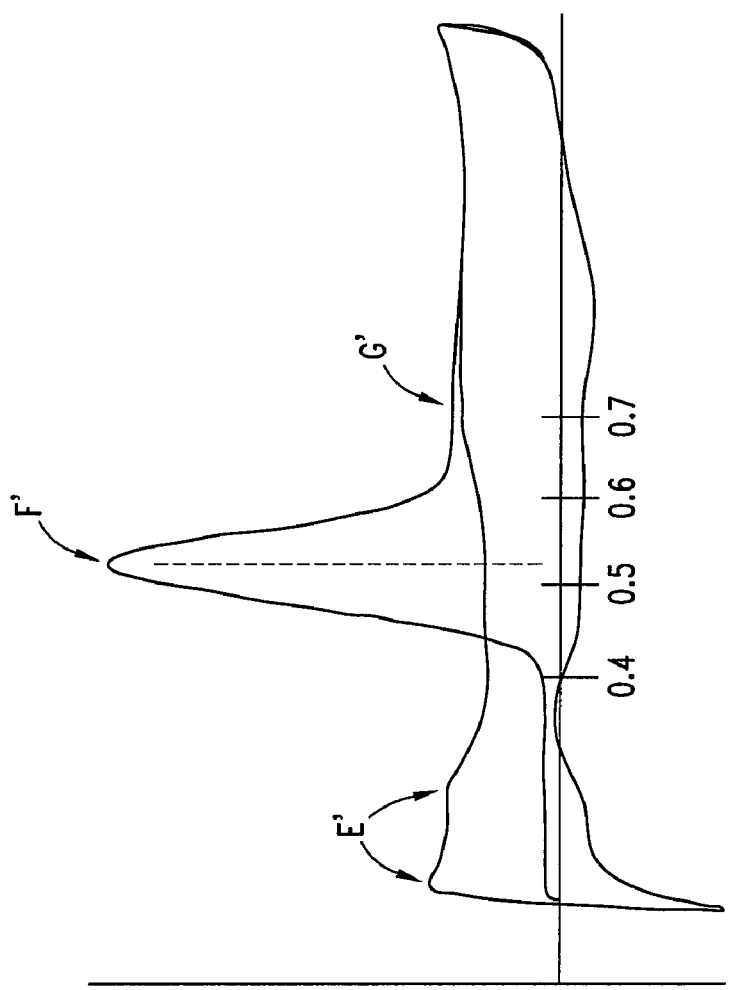
FIG. 6 is a carbon monoxide stripping cyclic voltammogram for a PEM fuel cathode after start/stop duty cycling.

Compare FIGS. 3 and 4 with the anode and cathode voltammograms for Sample 2, the fuel cell taken from stack FC-2, illustrated in FIGS. 5 and 6, respectively. As shown in FIG. 5, the anode voltammogram shows the $H_2$ desorption peak (C') is not as defined, likely due to the overlap of the H2 desorption peaks of Pt and Pt—Ru catalysts, and the CO adsorption peak has shifted to higher potentials (D'). These results are consistent with increased Pt character in the anode catalyst. FIG. 5 strongly indicates that Ru is dealloying from the Pt and is being lost under the duty cycling conditions to which the FC-2 stack was exposed.

This conclusion is further supported by the changes to the cathode voltammogram in FIG. 6. The $H_2$ desorption peaks (E') are not as defined, and the lower potential peak has decreased; the CO adsorption peak (F') has shifted to lower potentials; and the Pt—O peak has been substantially reduced (G'). These results are the converse of FIG. 5, consistent with an increased Ru character in the cathode catalyst. As the anode catalyst was the only source of Ru, the conclusion is that Ru has migrated from the anode to the cathode in the fuel cells of FC-2.

The CO stripping CV data demonstrates that Ru in the Pt—Ru alloy of the anode catalyst can migrate to the cathode catalyst layer under the imposed duty cycling conditions. The change in the $I_{dl}$ region in FIG. 6 also suggests that $RuO_x$ and possibly $Ru(OH)_x$ present in the anode catalyst may also crossover to the cathode catalyst. Thus, under these conditions the $Ru^0(s)$ in the Pt—Ru alloy, and possibly the $RuO_x$ and $Ru(OH)_x$, appear to contribute to the loss of Ru in the anode structure.

Having identified that Ru migration is dependent on anode potential, applicants further investigated its sensitivity to potential cycling, ramp rate (i.e., rate of voltage rise/fall per second) and temperature.

CO Stripping Cyclic Voltammetry

Anode Potential Cycling vs. Steady State

The effect of anode potential cycling on Ru migration and resulting cathode performance was tested by CO stripping CV. Samples 3 and 4 were fuel cells identical to Sample 1, described above. For Sample 3, the same CO stripping CV procedure was followed as described for Sample 1, above, except that the 1%/99% $CO/N_2$ oxidant gases were supplied to the cathode for 25 hours, during which time the anode potential was cycled between 0.1 V and 0.95 V. The same procedure was followed for Sample 4, except that the anode potential was maintained at 1.2 V while the $CO/N_2$ oxidant gases were supplied to the cathode.

Figure 7A:
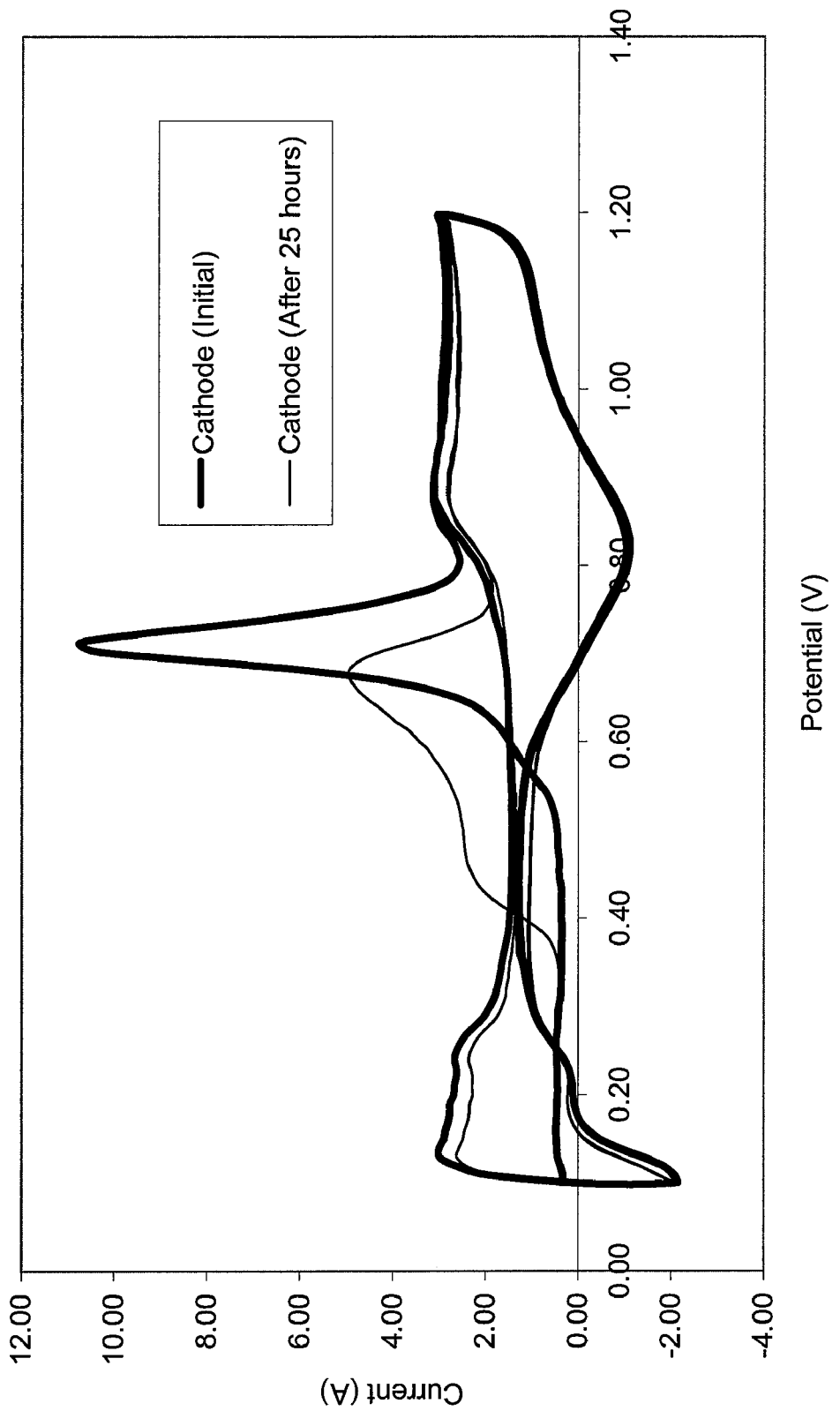
FIGS. 7a and 7b are cathode voltammograms for Samples 3 and 4.
Figure 7B:
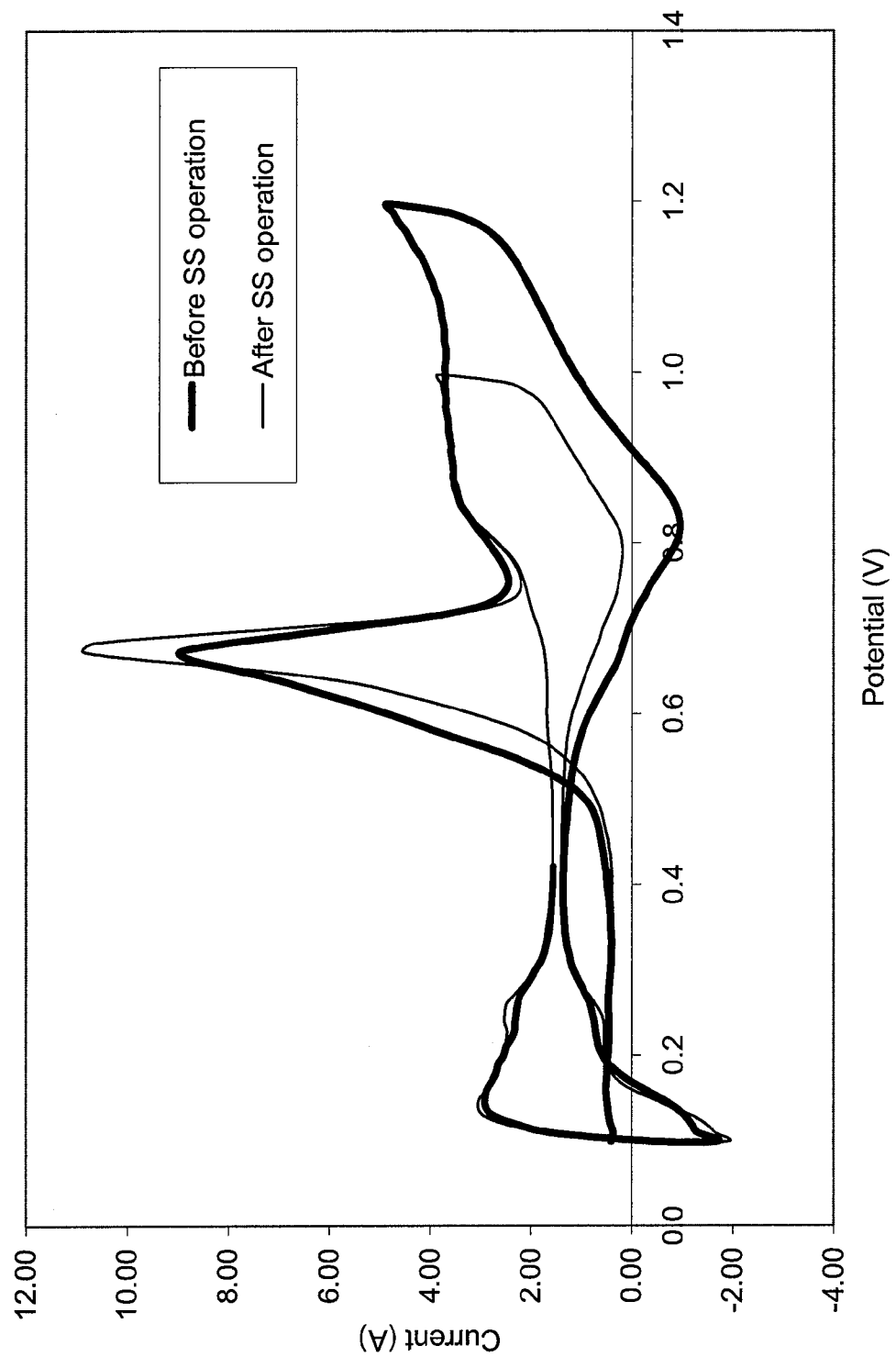

FIGS. 7a and 7b are the resulting cathode voltammograms for Samples 3 and 4, respectively, showing sweeps for the beginning and end of the test. A comparison of the cathode CO peak at the beginning of the test (A) and the end of the test (B) in FIG. 7b shows no significant change in oxygen reduction kinetics, indicating no Ru contamination of the cathode catalyst layer. This result is consistent with the formation of a passivating layer on the metal and metal oxide catalyst components under steady state conditions, preventing Ru migration from occurring. Conversely, comparing the same region in FIG. 7a, the CO peak has shifted to lower potentials and has been substantially reduced. These results are consistent with those of FIG. 4, and demonstrate that anode potential cycling has a significant impact on the observed increased Ru character in the cathode catalyst.

Ramp Rate Sensitivity

Having established that anode potential cycling increases the rate of Ru migration, two anode catalyst composition samples were subjected to CO stripping testing to determine the sensitivity to anode potential ramp rate on Ru migration. Samples 5 and 6 were made and tested as described for Sample 3, above, with the following modifications:

Sample 5: Sweep rate: 5 mV/s up, 1000 mV/s down

Sample 6: Sweep rate: 200 mV/s up, 1000 mV/s down

Figure 8A:
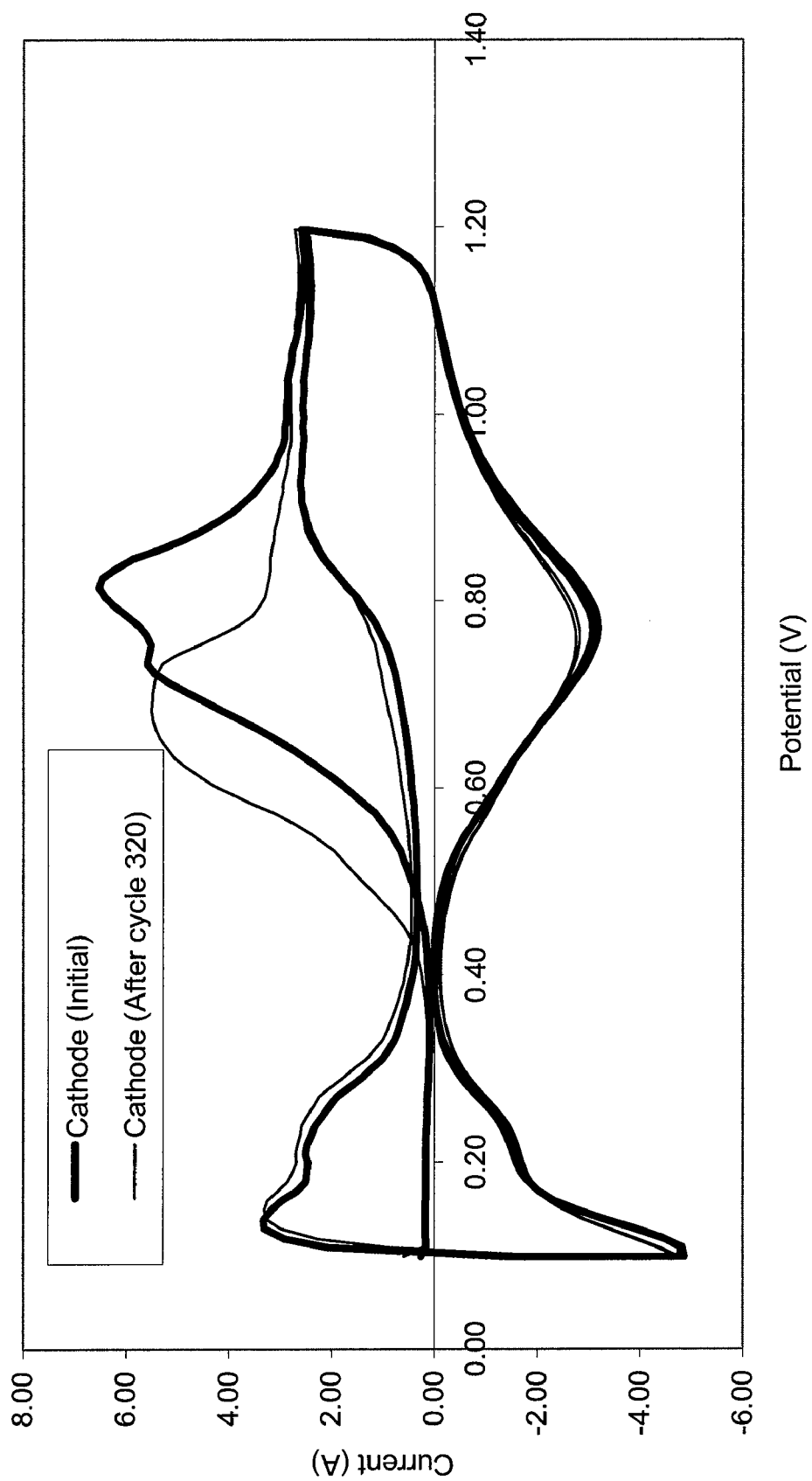
FIGS. 8a and 8b are cathode voltammograms for Samples 5 and 6.
Figure 8B:
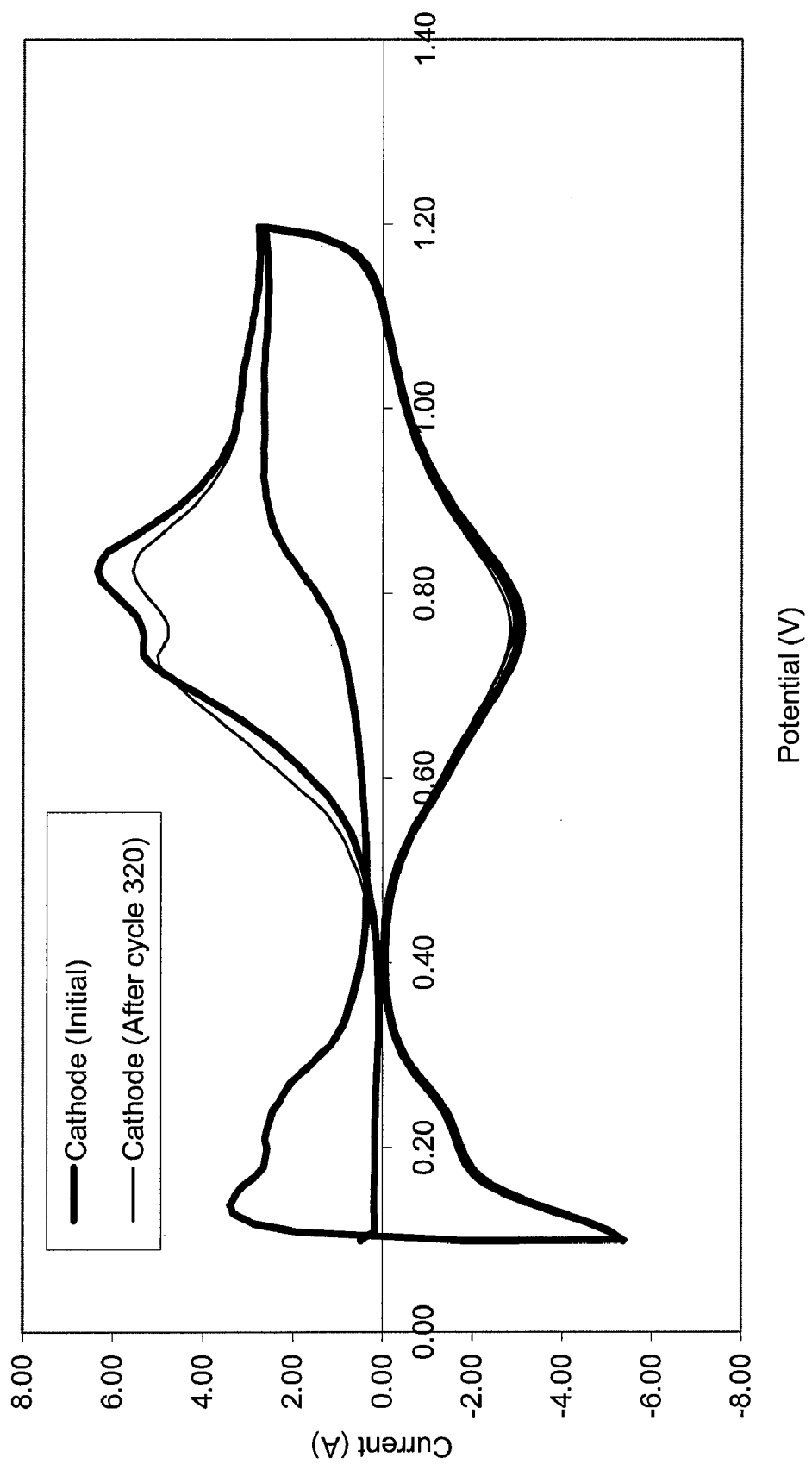

The resulting voltammograms for Samples 5 and 6 are illustrated in FIGS. 8a and 8b, respectively. In FIG. 8a, the significant shift in the CO peak at the end of the test (B) again indicates Ru contamination of the cathode catalyst layer. In comparison, there is comparatively little shift in the CO peak in FIG. 8b. This indicates that Ru crossover is sensitive to ramp rate, i.e., the magnitude of Ru crossover increases with the amount of time during which the anode potential is elevated.

Temperature sensitivity testing indicated that the rate of Ru crossover increased with increasing temperature (data not shown). This is the expected result of the Arrhenius temperature dependence of the reactions involved in the mechanisms described above.

Reversal Tolerance Testing

Several MEAs were assembled and tested under operating conditions that simulated prolonged cell voltage reversal conditions, to investigate the tolerance of various anode catalyst compositions to such conditions, and in particular, the impact of amorphous Ru oxides on reversal tolerance.

Duplicate MEA Samples 7-10 were prepared in a like manner to the MEAs described for FC-1-FC-4, above, except that:

(1) the cathode catalyst layer employed was 40% Pt supported on acetylene black carbon (Johnson Matthey Plc, London, UK);

(2) the anode catalyst layer comprised 40%/20% Pt—Ru supported on acetylene black carbon (Johnson Matthey Plc, London, UK) catalyst and Nafion® (88% catalyst and 12% ionomer); and (3) the anode catalyst layer contained the additional components shown in Table 2.

TABLE 2

MEA Samples 7-10; Additional anode catalyst component

| Sample | Additional anode catalyst component | RuIrO$_2$ loading (wt % based on total metal oxides) | RuIrO$_2$ Phase |
|---|---|---|---|
| 7 (control) | None | — | — |
| 8 | Unsupported RuIrO$_2$ oxide (90:10 mole ratio Ru/Ir; Johnson Matthey Plc, London, UK) | ~0.16-0.17 mg/cm$^2$ | Single phase crystal (rutile); trace of amorphous phase |
| 9 | Unsupported RuIrO$_2$ oxide (90:10 mole ratio Ru/Ir; Johnson Matthey Plc, London, UK) | ~0.16-0.17 mg/cm$^2$ | Single phase crystal (rutile) |
| 10 | Unsupported RuIrO$_2$ oxide (90:10 mole ratio Ru/Ir; Johnson Matthey Plc, London, UK) | ~0.16-0.17 mg/cm$^2$ | Single phase crystal (rutile) |

The MEAs were then tested in Ballard Mk 513 single cell test fixtures under the following conditions:

Temperature 75° C. (coolant inlet)-85° C. (coolant outlet)

Inlet Dew Point 75° C. (fuel and oxidant)

Fuel hydrogen

Oxidant air

Reactant inlet pressure 2.0 bara (fuel and oxidant)

Reactant stoichiometries 1.5 (fuel), 2.0 (oxidant)

The MEAs were conditioned overnight under the above conditions at 1 A/cm$^2$. The fuel supply was then switched to humidified nitrogen and the MEAs were operated at 500 mA/cm$^2$ until the cell voltage reached or exceeded -2.0 V. The average cell performance was calculated for Samples 7-10 based on the results for each of the duplicate MEAs.

Figure 9:
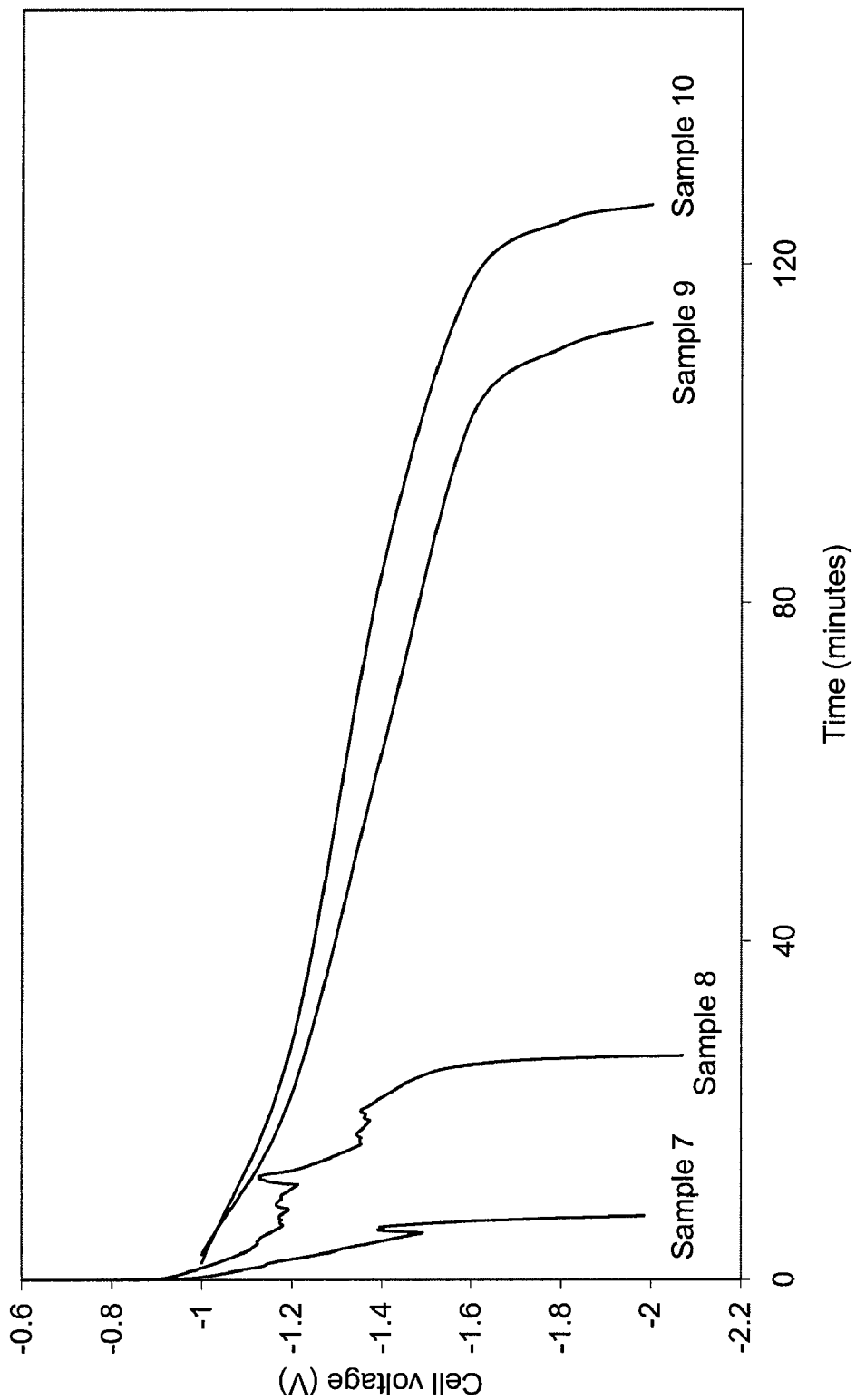
FIG. 9 is a plot of average cell voltage as a function of time for Samples 7-10.

FIG. 9 is a plot of average cell voltage as a function of time for Samples 7-10 under the above-described testing conditions. It has been previously been demonstrated that RuIrO$_2$ improves anode cell reversal tolerance; therefore, it is not surprising that the control Sample 7, which did not have RuIrO$_2$ in the anode catalyst layer, demonstrated the worst performance. It was surprising that Sample 8 performed nearly as badly, however, with markedly inferior performance in comparison to Samples 9 and 10. The RuIrO$_2$ in Samples 8-10 contained the same mixed metal oxide (90:10 Ru/Ir). However, Sample 8 also contained trace amounts of amorphous oxide that appears to have a marked negative impact on the reversal tolerance of the MEA. This is in contrast to Samples 9 and 10, which contained a single-phase solid solution of RuIrO$_2$ in the crystalline (rutile) form.

In one aspect, the present invention comprises an anode catalyst layer for a fuel cell having first and second catalyst compositions and a hydrophobic binder. The first catalyst composition comprises a noble metal, other than Ru, on a corrosion resistant support material; the second catalyst composition comprises a single-phase solid solution of a metal oxide containing Ru. The through-plane concentration of ionomer in the catalyst layer decreases as a function of distance from the membrane interface. In another aspect, the present invention comprises a GDE, catalyst-coated membrane (CCM) or MEA for a fuel cell having the foregoing anode catalyst layer. In a still further aspect, the present invention comprises fuel cells comprising this anode catalyst layer and fuel cell stacks comprising such fuel cells.

In some embodiments, the first catalyst composition comprises Pt or an alloy of Pt. In embodiments where a Pt alloy catalyst is employed, the alloy may include another noble metal (e.g., Pt—Au) or a non-noble metal (e.g., Pt—Mo and Pt—Co—Ir).

The corrosion resistant support material may comprise carbon, if desired. Generally, the corrosion resistance of a carbon support material is related to its graphitic nature: the more graphitic the carbon support, the more corrosion resistant it is. The graphitic nature of a carbon is exemplified by the carbon interlayer separation ($d_{002}$) determined through x-ray diffraction. Carbons with smaller $d_{002}$ spacings may be more suitable for corrosion resistant support materials. Synthetic graphite has a $d_{002}$ spacing of 3.36 Å, compared with 3.50 Å for Shawinigan acetylene black and 3.64 Å for Vulcan XC72R. The BET surface area measured under nitrogen provides another indication of corrosion resistance for carbon support materials. Generally, a lower BET surface area corresponds to a smaller amount of corrodible microporosity, i.e., surface area contained in pores having a diameter of less than 20 Å. BET analysis of Shawinigan acetylene black indicates a lower level of corrodible microporosity relative to Vulcan XC72R (80 m$^2$/g and 228 m$^2$/g, respectively). Graphitized carbon BA (TKK, Tokyo, JP) has a similar BET surface area to Shawinigan acetylene carbon and is a suitable carbon support material in some embodiments. In other embodiments suitable carbon support materials may include boron and/or phosphorous-doped carbons, carbon nanotubes and aerogels.

Instead of carbon, carbides or electrically conductive metal oxides may be considered as a suitable high surface area support for the corrosion resistant support material. For instance, Ti$_4$O$_7$ may serve as a corrosion resistant support material in some embodiments. In this regard, other valve metal oxides might be considered as well if they have acceptable electronic conductivity when acting as catalyst supports.

In further embodiments, the loading of the first catalyst composition on the corrosion resistant support material is from 30-60% by weight. Though a lower catalyst loading on the support is typically preferred in terms of electrochemical surface area per gram of platinum (ECA), a higher catalyst loading and coverage of the support appears preferable in terms of reducing corrosion of the support and in reducing catalyst loss during fuel cell operation.

Ruthenium oxide (rutile form, RuO$_x$ where 1<x≦2) is the more active catalyst for oxygen evolution and thus seems to be a preferred second catalyst composition. However, if a voltage reversal is prolonged or if there is sufficient cumulative time in reversal, the ruthenium oxide may be further oxidized to RuO$_3$ or RuO$_4$ and may dissolve in the membrane electrolyte (see discussion re Ru crossover mechanisms, above). A mixture or solid solution of ruthenium and iridium oxides may afford a preferred combination of low oxygen overpotential and stability; however, as will be discussed in greater detail below, applicants have determined that sub optimal voltage reversal tolerance is demonstrated in mixtures of ruthenium and iridium oxide containing trace amounts of amorphous oxides.

Therefore, the second catalyst composition comprises a single-phase solid solution of a metal oxide containing Ru. In certain embodiments, the second catalyst composition comprises a single-phase solid solution of RuIrO$_2$ oxide (90:10 mole ratio of Ru:Ir). In further embodiments, a solid solution of ruthenium oxide and a valve metal oxide, such as titanium dioxide, for example, may afford another preferred combination for low oxygen overpotential and stability.

The second catalyst composition may either be unsupported or supported in dispersed form on a suitable electrically conducting particulate support. If desired, the second catalyst composition may even be supported on the same support as the first catalyst composition. (For instance, the first catalyst composition may be deposited on a suitable support initially and then the second catalyst composition may be deposited thereon afterwards.) High surface area carbons such as acetylene or furnace blacks are commonly used as supports for such catalysts. Preferably, the support used is itself tolerant to voltage reversal. Thus, it is desirable to consider using carbon supports that are more corrosion resistant (for example, the corrosion resistant support materials discussed above).

The amount of the second catalyst composition that is desirably incorporated will depend on such factors as the fuel cell stack construction and operating conditions (for example, current that may be expected in reversal), cost, and so on. It is expected that some empirical trials will determine an optimum amount for a given application.

The second catalyst composition may be incorporated in the anode in various ways. For example, it may be located where water is readily available and such that it can favorably compete with the other oxidation reactions that degrade the anode structure. In certain embodiments, the first and second catalyst compositions may be mixed together and the mixture applied in a common layer or layers on a suitable anode substrate. As mentioned previously, in other embodiments the second catalyst composition may be supported on the same support as the first composition, and thus both compositions are already "mixed" for application in one or more layers on an anode substrate. In further embodiments, the two compositions may instead be applied in separate layers on an anode substrate, thereby making a bilayer or multilayer anode structure where the first and second catalyst compositions are in discrete layers. The manner of incorporating the second catalyst composition is not essential to the present anode, and persons of ordinary skill in the art can readily select an appropriate manner of incorporation for a given application.

As previously mentioned, the through-plane concentration of ionomer in the catalyst layer of the present anode decreases as a function of distance from the membrane interface. The hydrophobic binder may comprise a fluororesin or other suitable polymer, as desired. Examples of suitable fluororesins include terpolymers of vinylidene fluoride, hexafluoropropylene and tetrafluoroethylene, copolymers of ethylene and tetrafluoroethylene, copolymers of hexafluoropropylene and tetrafluorethylene, polyvinylidene fluorides, and polytetrafluoroethylenes.

The present anode catalyst layer may be applied to a GDL to form an anode GDE or to the surface of a PEM to form a CCM. The anode GDE or CCM can then be bonded with other components to form an MEA. Alternatively, the present anode catalyst layer may be formed on another substrate, such as a release film, and then applied to a GDL or PEM. As a further alternative, the application of the anode catalyst layer on the desired substrate may occur at the same time the remaining MEA components are bonded together.

The present anode catalyst layer may be applied according to known methods. For example, the present anode catalyst may be applied as a catalyst ink or slurry, or as a dry mixture. Catalyst inks may be applied using a variety of suitable techniques (e.g., hand and machine methods, including hand brushing, notch bar coating, fluid bearing die coating, wire-wound rod coating, fluid bearing coating, slot-fed knife coating, three-roll coating, screen-printing and decal transfer) to the surface of the membrane or GDL. The catalyst mixture may be applied by the decal transfer method described in U.S. application Ser. No. 11/408,787, if desired. Alternatively, the catalyst ink may be applied via electrostatic deposition, as described in U.S. 2006/0045985. Examples of dry deposition methods include electrostatic powder deposition techniques and decal transfer.

Catalyst inks typically incorporate the catalysts and binder in a solvent/dispersant to form a solution, dispersion or colloidal mixture. Suitable solvents/dispersants include water, organic solvents such as alcohols and polar aprotic solvents (e.g., N-methylpyrrolidinone, dimethylsulfoxide, and N,N-dimethylacetamide), and mixtures thereof. Depending on the amount of water, one can distinguish water-based inks, wherein water forms the major part of the solvents used, from inks wherein organic solvents form the major part. Catalyst inks may further include surfactants and/or pore forming agents, if desired. Suitable pore formers include methyl cellulose; sublimating pore-forming agents such as durene, camphene, camphor and naphthalene; and pore-forming solvents that are immiscible with the catalyst ink solvent/dispersant, such as n-butyl acetate in polar aprotic solvent/dispersant systems.

To achieve a through-plane concentration of ionomer in the anode catalyst layer that decreases as a function of distance from the membrane interface, the catalyst mixture applied to the desired substrate may be prepared without the inclusion of ionomer, if desired. This may have some desirable processing advantages. For example, the catalyst mixture may be applied to a substrate and subsequently heated to the sintering temperature of the hydrophobic binder; this process may increase the mechanical strength of the catalyst layer and/or its hydrophobic character; in the case of PTFE, it would not be advisable to sinter a catalyst mixture containing ionomer, as this process would damage or destroy most ionomers. During MEA bonding, some of the ionomer from the PEM may infiltrate into the facing surface of the present anode catalyst layer, but bonding conditions should be selected to ensure the ionomer does not penetrate so deeply into the anode catalyst layer that its through-plane concentration is uniform. If desired, a layer of ionomer may be applied to the anode catalyst layer or PEM prior to bonding, in order to facilitate bonding between these MEA layers; again, the amount of ionomer applied should be selected to ensure the ionomer does not penetrate so deeply into the anode catalyst layer that its through-plane concentration is uniform. For example, the applicants have found that the application of a 0.2 mg/cm$^2$ Nafion® spraycoat to the anode catalyst layer before bonding the MEA is adequate to assist in the bonding process while maintaining a decreasing through-plane concentration of ionomer in the anode catalyst layer, although it is recognized that some routine optimization may be required to determine appropriate bonding conditions for a given application.

The selection of additional components for the catalyst mixture and the choice of application method and substrate to which it is applied is not essential to the present invention, and will depend on the physical characteristics of the mixture and the substrate to which it will be applied, the application method and desired structure of the catalyst layer. Persons of ordinary skill in the art can readily select suitable catalyst mixtures and application methods for a given application.

Example 1

CO Stripping Cyclic Voltammetry

The cathode performance of a fuel cell incorporating an embodiment of the present anode was tested by CO stripping CV. Sample 11 was identical to Sample 1, described above, except that the anode catalyst contained an 4.5:1 admixture of 50% Pt supported on graphitized carbon black (TKK, Tokyo, JP) and unsupported RuIrO$_2$ (single-phase solid solution (90:10 mole ratio Ru/Ir); Johnson Matthey Plc, London, UK), at a catalyst loading of ~0.25-0.35 mg Pt/cm$^2$ and ~0.16-0.17 mg $RuIrO_2/cm^2$. The same CO stripping CV procedure was used as described for Samples 1 and 2.

Figure 10:
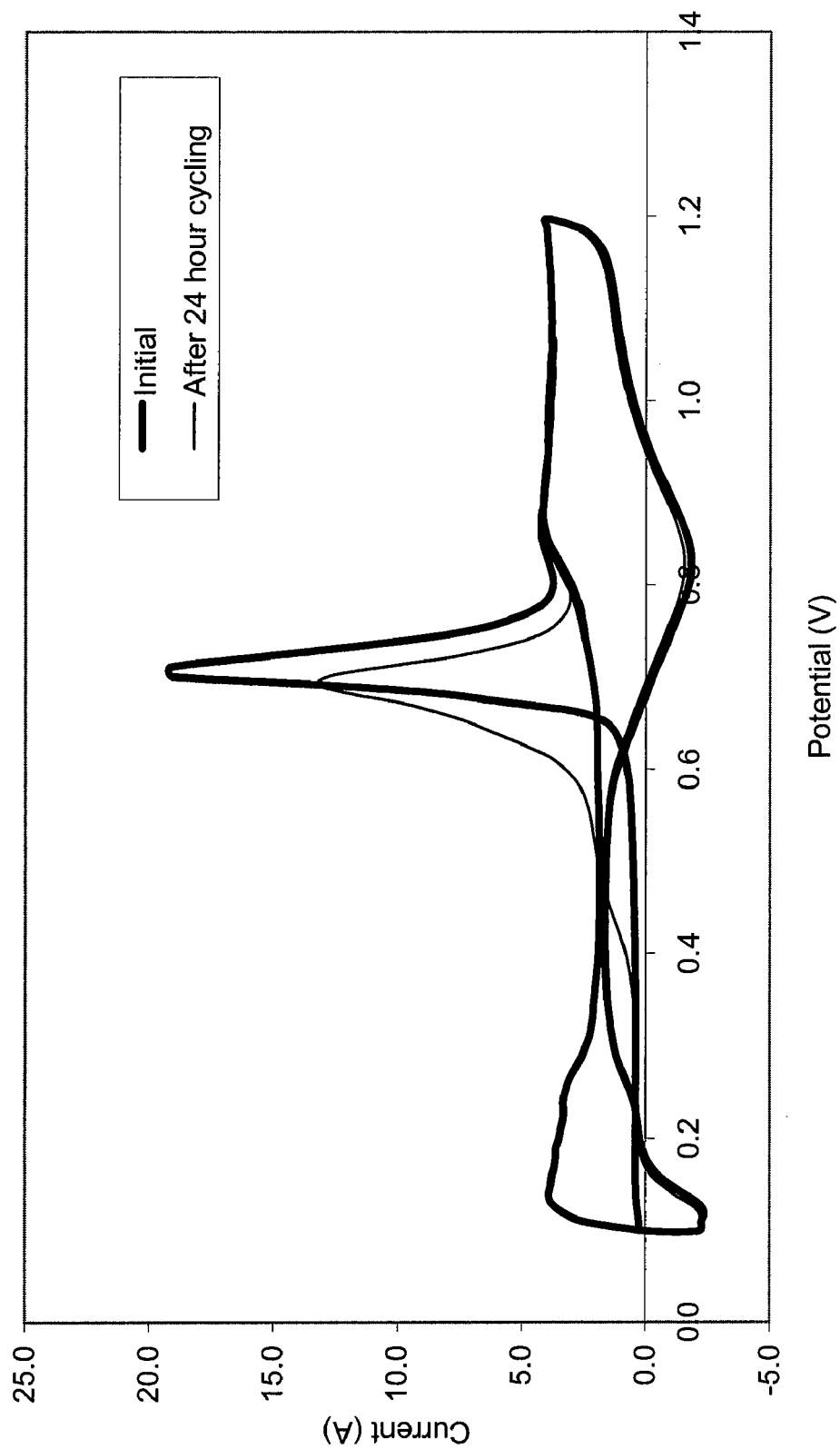
FIG. 10 is a voltammogram for Sample 11.

The resulting cathode voltammogram for Sample 11 is illustrated in FIG. 10. A comparison of the cathode CO peak at the beginning of the test (A) and the end of the test (B) shows no significant change in oxygen reduction kinetics, indicating no Ru contamination of the cathode catalyst layer. This is consistent with the presence of single phase crystal (rutile) $RuIrO_2$, which has been shown to be stable under cyclic voltammetry (data not shown).

Example 2

Reversal Tolerance Testing

The testing of Samples 7-10 clearly demonstrates the unexpected and significant negative impact of the presence of amorphous Ru oxides on MEA cell reversal tolerance. Further cell reversal tolerance testing was performed to demonstrate the impact of the presence or absence of ionomer in the anode catalyst layer mixture.

MEA Samples 12-14 were assembled and tested using Ballard Mk 902 hardware under the operating conditions described for Samples 7-10, above. Sample 12, which incorporated an embodiment of the present anode, was compared to MEAs with anode catalyst layers comprising catalyst and ionomer. Samples 12-14 were prepared in a like manner to the MEAs described for FC-1-FC-4, above, except that:

(1) the cathode catalyst layer comprised catalyst (50% Pt supported on graphitized carbon black (TKK, Tokyo, JP)) and ionomer (Nafion®) in a 2:1 ratio;

(2) the anode catalyst comprised a 4.5:1 admixture of 50% Pt supported on graphitized carbon black (TKK, Tokyo, JP) and unsupported $RuIrO_2$ (single-phase solid solution (90:10 mole ratio Ru/Ir); Johnson Matthey Plc, London, UK), at a catalyst loading of ~0.25-0.35 mg $Pt/cm^2$ and ~0.16-0.17 mg $RuIrO_2/cm^2$; and (3) the anode catalyst layer contained additional components, and the PEM varied, as shown in Table 3.

TABLE 3

MEA components for Samples 11-13.

| Sample | Additional anode catalyst layer components | PEM |
|---|---|---|
| 12 | PTFE (88% catalyst and 12% binder) | Nafion® NRE-211 membrane (DuPont Fuel Cells, NC, USA) |
| 13 | Nafion® | 25 μm composite membrane (W L Gore & Assoc., DE, USA) |
| 14 | Nafion® | Nafion® N-112 membrane (DuPont Fuel Cells, NC, USA) |

Figure 11:
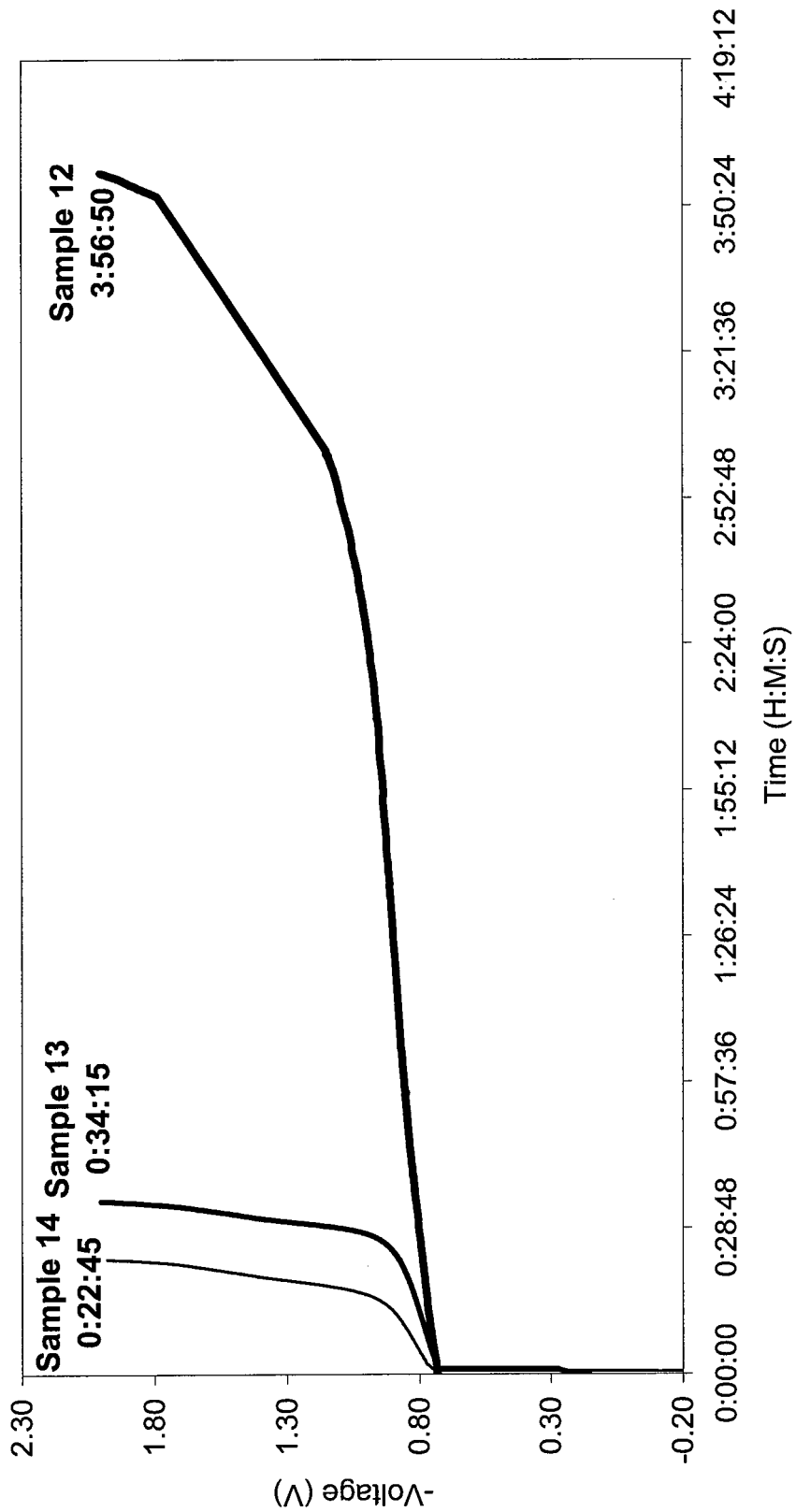
FIG. 11 is a graph of the cell voltage as a function of time for Samples 12-14.

FIG. 11 is a graph of the cell voltage as a function of time for Samples 12-14. As clearly shown in FIG. 11, Sample 12 showed dramatically improved reversal tolerance compared to Samples 13 and 14. Indeed, Sample 12 showed an 8-10-fold improvement in reversal tolerance compared to the samples that contained a uniform concentration of ionomer in the anode catalyst layer.

Example 3

Air Polarization

Cell reversal tolerance testing demonstrates that the present anode has significantly superior performance in this regard. While this is an important parameter, other performance parameters are also important for fuel cell operation, and further testing was done to determine whether the present anode negatively impacted them.

Three 10-cell Ballard Mk 902 stacks were assembled to test the baseline performance of an embodiment of the present anode against MEAs containing Pt—Ru anode catalysts and MEAs containing a constant concentration of ionomer in the anode catalyst layer. The MEAs for stacks FC-5, FC-6 and FC-7 were prepared in a like manner to the MEAs described for FC-1-FC-4, above, with the following exceptions:

(1) a Nafion® N-112 membrane (DuPont Fuel Cells, N.C., USA) was used in each sample; and (2) the anode and cathode catalyst layers were as described in Table 4, below.

TABLE 4

MEA components for FC-5-FC-7.

| Sample | Anode catalyst layer components | Cathode catalyst layer components |
|---|---|---|
| FC-5 | Catalyst (88%): 40%/20% Pt—Ru supported on acetylene black carbon (Johnson Matthey Plc, London, UK), at ~0.25-0.35 mg $Pt/cm^2$; Binder (12%): PTFE | Catalyst (67%): 40% Pt supported on acetylene black carbon (Johnson Matthey Plc, London, UK), at ~0.7-0.8 mg $Pt/cm^2$ Ionomer (33%): Nafion® |
| FC-6 | Catalyst (88%): 4.5:1 admixture of 50% Pt supported on graphitized carbon black (TKK, Tokyo, JP) and unsupported $RuIrO_2$ (single-phase solid solution (90:10 mole ratio Ru/Ir); Johnson Matthey Plc, London, UK), at a catalyst loading of ~0.25-0.35 mg $Pt/cm^2$ and ~0.16-0.17 mg $RuIrO_2/cm^2$; Ionomer (12%): Nafion® | Catalyst (67%): 50% Pt supported on graphitized carbon black (Tanaka Kikinzoku Kogyo KK (TKK),Tokyo, JP), at ~0.7-0.8 mg $Pt/cm^2$ Ionomer (33%): Nafion® |
| FC-7 | Catalyst (88%): 4.5:1 admixture of 50% Pt supported on graphitized carbon black (TKK, Tokyo, JP) and unsupported $RuIrO_2$ (single-phase solid solution (90:10 mole ratio Ru/Ir); Johnson Matthey Plc, London, UK), at a catalyst loading of ~0.25-0.35 mg $Pt/cm^2$ and ~0.16-0.17 mg $RuIrO_2/cm^2$; Binder (12%): PTFE | Catalyst (67%): 50% Pt supported on graphitized carbon black (Tanaka Kikinzoku Kogyo KK (TKK), Tokyo, JP), at ~0.7-0.8 mg $Pt/cm^2$ Ionomer (33%): Nafion® |

Stacks FC-5, FC-6 and FC-7 were operated for 2 hours at varying loads under the following conditions:

Temperature 70° C. (coolant inlet)-80° C. (coolant outlet)

Inlet Dew Point 63° C. (fuel and oxidant)

Fuel 100% hydrogen

Oxidant air

Reactant inlet pressure 2.0 bara (fuel and oxidant)

Reactant stoichiometries 1.5 (fuel), 1.4-1.8 (oxidant)

Figure 12:
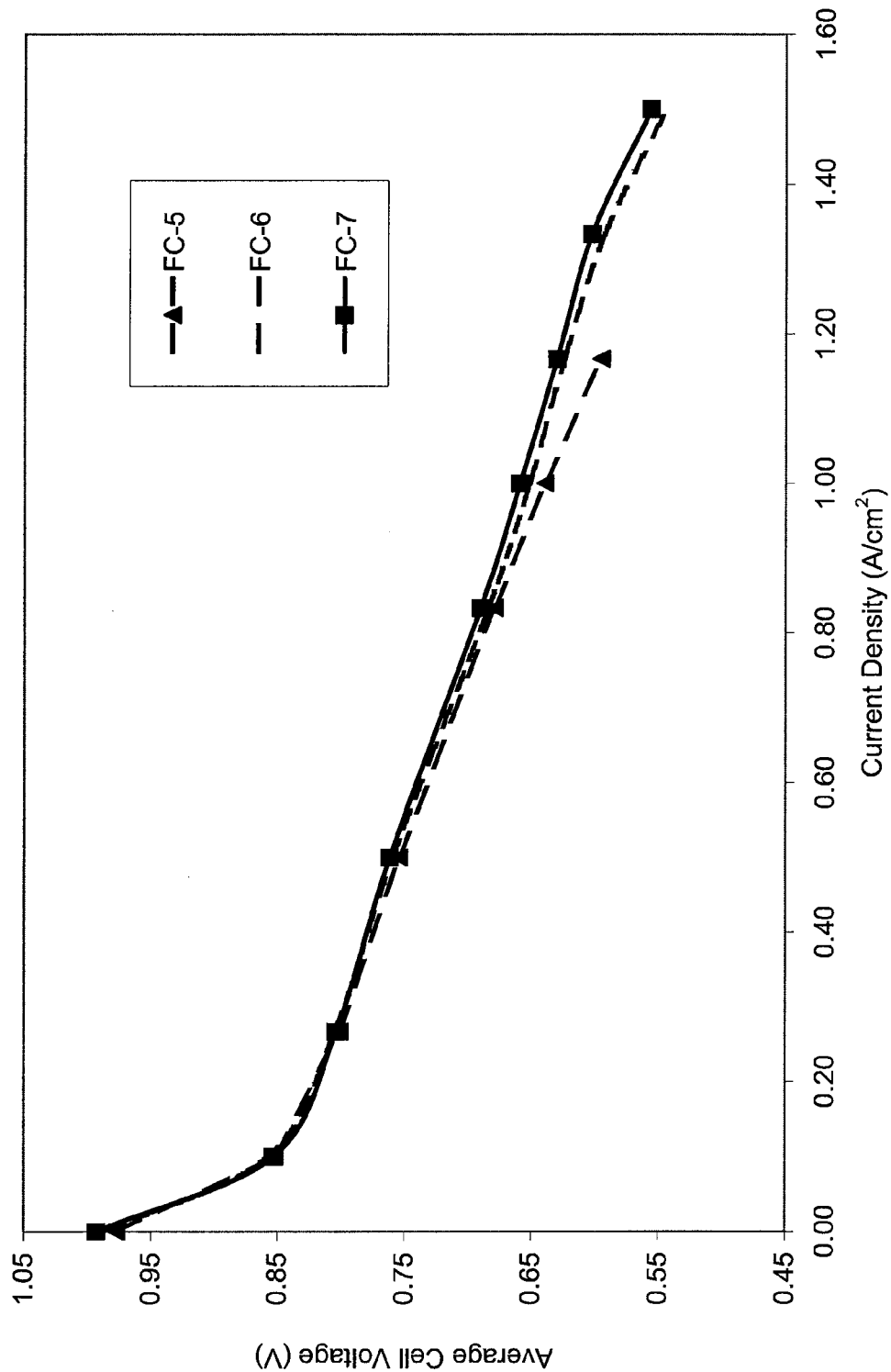
FIG. 12 is a graph of the EOL polarization curves for the stacks in Example 3.

FIG. 12 is a graph of the EOL polarization curves for the stacks in Example 3. FC-7, which incorporated an embodiment of the present anode, demonstrated comparable performance to stacks having MEAs that contained standard Pt—Ru anode catalysts (FC-5) and ionomer in the anode catalyst layer (FC-6).

Thus, the present anode does not sacrifice baseline performance for a significantly improved cell reversal tolerance. Further testing was also conducted to determine whether the present anode showed improved performance in start/stop cycling tests.

Example 4

Start/Stop Cycle Testing

Stack FC-8 (EDH 564)

A further 20-cell Ballard Mk 1100 stack incorporating an embodiment of the present anode was assembled and subjected to start/stop cycle testing. FC-8 was assembled as described for stacks FC-1-FC-4, above, except that the anode catalyst contained an 4.5:1 admixture of 50% Pt supported on graphitized carbon black (TKK, Tokyo, JP) and unsupported $RuIrO_2$ (single-phase solid solution (90:10 mole ratio Ru/Ir); Johnson Matthey Plc, London, UK), at a catalyst loading of 0.25-0.35 mg $Pt/cm^2$ and 0.16-0.17 mg $RuIrO_2/cm^2$. FC-5 was tested according to Duty Cycle 1, as described above.

Figure 13:
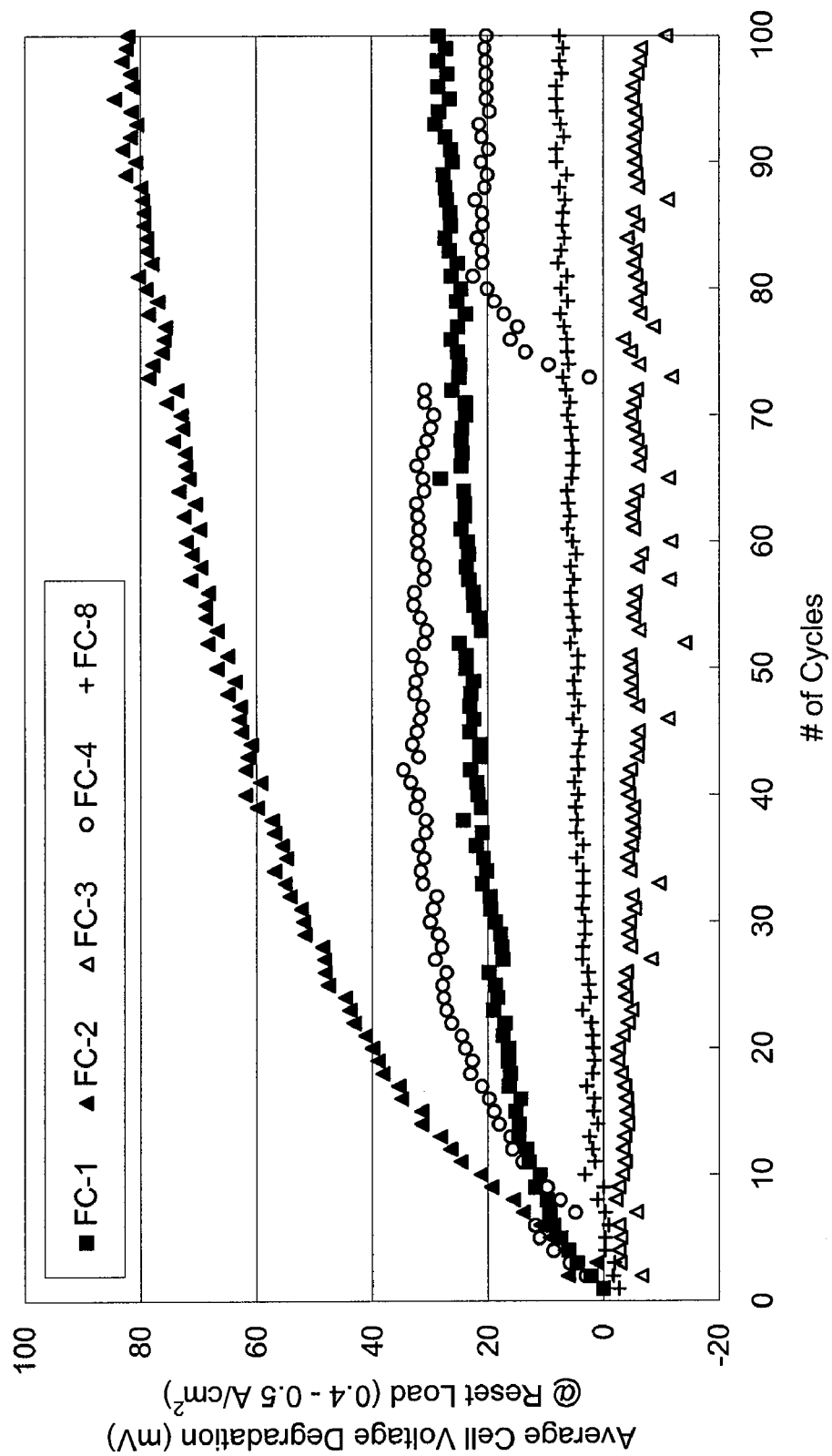
FIG. 13 is a graph of the average cell voltage degradation as a function of start/stop cycles for fuel cell stack FC-8.

FIG. 13 is a graph of the average cell voltage degradation as a function of start/stop cycles for fuel cell stack FC-8. The plots for FC-1-FC-4 from FIG. 1 have also been included for ease of comparison. As shown in FIG. 13, the voltage degradation for FC-8 was dramatically lower than the voltage degradation of FC-2, and was significantly improved over FC-1 or FC-4. Furthermore, FC-8 was subsequently tested under Duty Cycle 2, above, for an additional 100 cycles and showed substantially the same voltage degradation (data not shown). It should also be noted that after 2 sets of 10 30-second air starvation cycles and another 75 cycles under Duty Cycle 4, FC-4 continued to recover some performance; although it still exhibited higher voltage degradation compared to FC-8 at 150 cycles (data not shown).

These results clearly demonstrate the fuel cells incorporating the present anode perform vastly better than fuel cells with Pt—Ru anode catalysts under the test conditions. Indeed, FC-5 performed significantly better than FC-4, which incorporated a fast anode purge in its operating protocol, and performed almost as well as FC-3. Particularly in applications where it is undesirable or impractical to maintain hydrogen on the anode during shutdown, these results indicate that incorporating the present anode may be a preferable approach to operational mitigation strategies that are currently employed.

Example 3

CO Tolerance Testing

Stacks FC-9 (SN 4269) and FC-10 (EDH 676)

Two 20-cell Ballard Mk 1100 stack incorporating MEAs made as described for Sample 11, above, were assembled and tested under constant load (155 A) conditions in the presence of CO, as follows:

Temperature 65° C. (coolant inlet)-70° C. (coolant outlet)

Inlet Dew Point 60° C. (fuel and oxidant)

Fuel Hydrogen+0.6 ppm CO (FC-6)
Hydrogen+1.0 ppm CO (FC-7)

Oxidant Air

Reactant inlet pressure 2.0 bara (fuel), 1.6 bara (oxidant)

Oxidant stoichiometry 1.7 (fuel), 1.8 (oxidant)

FC-9 was supplied with hydrogen containing 0.6 ppm CO as fuel at a stoichiometry of 1.7, and was operated with anode flow through. FC-10 was operated with anode recirculation, and was supplied with hydrogen containing 1.0 ppm CO at a stoichiometry of 1.0. The tested CO levels are consistent with the concentration of CO in commercially available hydrogen.

Figure 14:
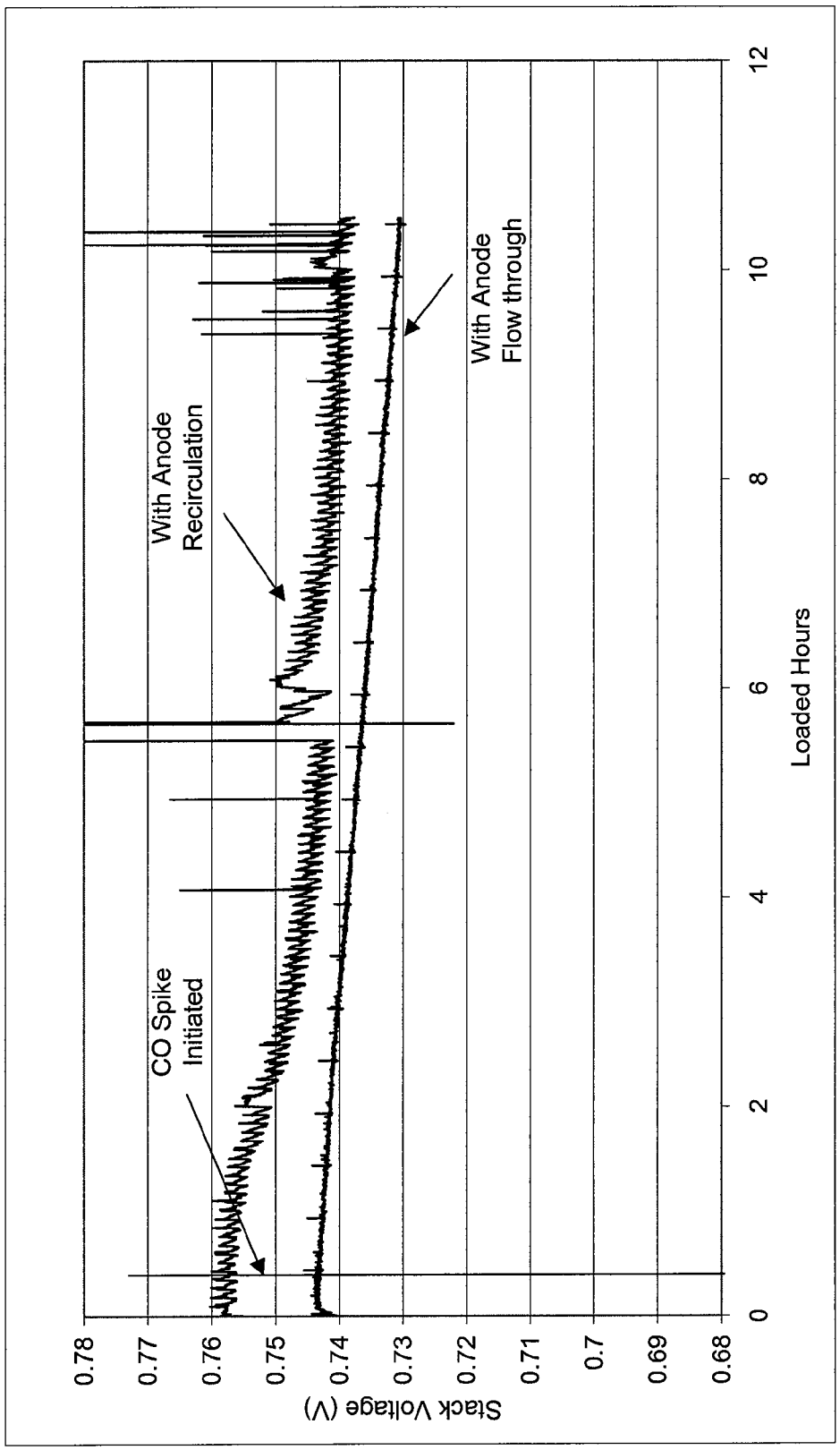
FIG. 14 is a plot of the stack voltage as a function of time for stacks FC-9 and FC-10.

FIG. 14 is a plot of stack voltage as a function of time for stacks FC-9 and FC-10. The voltage loss for the stacks over the 10-hour test period was 14 and 17 mV, respectively. This relatively low performance loss demonstrates that MEAs incorporating an embodiment of the present anode have satisfactory CO tolerance and capability to operate on commercially available hydrogen, despite the absence of Ru metal in the first catalyst composition.

The results show that anode catalysts containing Ru and/or amorphous Ru oxides demonstrate unacceptably high performance degradation in start/stop cycling tests; that the presence of amorphous Ru oxides can result in undesirably low cell reversal tolerance; and that anodes that do not have a decreasing concentration of ionomer in the catalyst layer also exhibit undesirably low cell reversal tolerance. The results also show that MEAs and fuel cells employing the present anode demonstrate markedly improved cell reversal tolerance and performance in start/stop cycling tests, while retaining baseline performance and performance in the presence of CO.

While the present anodes have been described for use in PEM fuel cells, it is anticipated that they would be useful in other fuel cells having an operating temperature below about 250° C. They are particularly suited for acid electrolyte fuel cells, including phosphoric acid, PEM and liquid feed fuel cells.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. An electrode assembly for a fuel cell comprising an electrolyte interposed between an anode and cathode, a cathode catalyst layer interposed between the electrolyte and the cathode, and an anode catalyst layer interposed between the electrolyte and the anode, the anode catalyst layer comprising:
   a first catalyst composition comprising a noble metal, other than Ru, on a corrosion resistant support material;
   a second catalyst composition consisting essentially of a single-phase solid solution of a metal oxide containing Ru; and
   a hydrophobic binder,
   wherein a through-plane concentration of an ionomer in the catalyst layer decreases as a function of distance from the electrolyte.

2. A catalyst-coated membrane comprising a polymer electrolyte membrane, a cathode catalyst layer on at least a portion of a first major surface thereof, and an anode catalyst layer on at least a portion of a second major surface thereof, the anode catalyst layer comprising:
   a first catalyst composition comprising a noble metal, other than Ru, on a corrosion resistant support material;
   a second catalyst composition consisting essentially of a single-phase solid solution of a metal oxide containing Ru; and
   a hydrophobic binder,
   wherein a through-plane concentration of an ionomer in the catalyst layer decreases as a function of distance from the membrane.

3. A fuel cell stack comprising a plurality of fuel cells, the fuel cells each comprising an electrode assembly according to claim 1.

* * * * *